US012464572B2

(12) United States Patent
Sakhnini et al.

(10) Patent No.: US 12,464,572 B2
(45) Date of Patent: Nov. 4, 2025

(54) BWP SWITCHING IN RACH PROCEDURE

(71) Applicant: QUALCOMM Incorporated, San Diego, CA (US)

(72) Inventors: Iyab Issam Sakhnini, San Diego, CA (US); Tao Luo, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 621 days.

(21) Appl. No.: 17/662,838

(22) Filed: May 10, 2022

(65) Prior Publication Data

US 2022/0369384 A1    Nov. 17, 2022

Related U.S. Application Data

(60) Provisional application No. 63/187,316, filed on May 11, 2021.

(51) Int. Cl.
  *H04W 74/0833* (2024.01)
  *H04L 27/26* (2006.01)
  *H04W 72/044* (2023.01)
  *H04W 74/08* (2024.01)

(52) U.S. Cl.
  CPC ... *H04W 74/0841* (2013.01); *H04L 27/26025* (2021.01); *H04W 72/044* (2013.01); *H04W 74/0833* (2013.01); *H04W 74/0866* (2013.01)

(58) Field of Classification Search
  CPC ......... H04W 74/0841; H04W 74/0866; H04W 74/0833; H04W 72/044; H04L 27/26025
  See application file for complete search history.

(56) References Cited

U.S. PATENT DOCUMENTS 11,930,525 B2 *   3/2024  Zhang ................... H04L 5/0078
2019/0357262 A1   11/2019 Cirik et al.

FOREIGN PATENT DOCUMENTS

WO    WO-2021029592 A1 *  2/2021  ............. H04L 5/001

OTHER PUBLICATIONS

3GPP TS 38.133 V16.3.0 (Mar. 2020) (Year: 2020).*
Hwang J., WO-2021029592-A1—Translated, Feb. 18, 2021, WIPO, (Year: 2021).*
International Search Report and Written Opinion—PCT/US2022/028758—ISA/EPO—Jul. 14, 2022.

* cited by examiner

*Primary Examiner* — Yemane Mesfin
*Assistant Examiner* — Jia Hao Deng
(74) *Attorney, Agent, or Firm* — Kevin M. Donnelly; Procopio, Cory, Hargreaves & Savitch LLP

(57) ABSTRACT

A user equipment (UE) may transmit a first random access message to a base station in a first bandwidth part (BWP), switch from the first BWP to a second BWP, and start a timer following a time gap after transmission of the first random access message in the first BWP, the timer associated with a window of time for receiving a second random access message from the base station in the second BWP. The window of time may be a random access response (RAR) window or a contention resolution window that may extend until the expiration of the timer. The switch from the first BWP to the second BWP may be based on a subcarrier spacing (SCS) change from a first SCS to a second SCS.

29 Claims, 13 Drawing Sheets

BWP SWITCHING IN RACH PROCEDURE

CROSS REFERENCE TO RELATED APPLICATION(S)

This application claims the benefit of and priority to U.S. Provisional Application Ser. No. 63/187,316, entitled "BWP SWITCHING IN RACH PROCEDURE" and filed on May 11, 2021, which is expressly incorporated by reference herein in its entirety.

TECHNICAL FIELD

The present disclosure relates generally to wireless communication systems, and more particularly, to bandwidth part (BWP) switching during a random access channel (RACH) procedure.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (for example, with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

A user equipment (UE) may perform an initial access procedure to establish a radio resource control (RRC) connection with a wireless network including a network node. The UE may select a random access channel (RACH) resource and communicate initial access messages in RACH occasion (RO) associated with the selected RACH resource.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a user equipment (UE) or a base station. The UE may transmit a first random access message to the base station in a first bandwidth part (BWP), switch from the first BWP to a second BWP after transmitting the first random access message, start a timer associated a window of time to receive with a second random access message from the base station in the second BWP following a time gap after transmission of the first random access message, and monitor for the second random access message within the window of time to receive the second random access message. The timer may correspond with a random access response (RAR) window or a contention resolution window. The switch from the first BWP to the second BWP may correspond to or be based on a change of a subcarrier spacing (SCS) from a first SCS to a second SCS. The UE may transmit an indication of support for a capability associated with a BWP switch delay or a time gap candidate to the base station, and the base station may determine the configuration of the time gap. The base station may transmit the configuration of the time gap to the UE. The time gap may be determined based on the configuration of the time gap. The configuration of the time gap may be defined for the base station and the UE. The time gap may be determined based on at least one of a function of a BWP switch delay, a relationship between a first SCS of the first BWP and a second SCS of the second BWP, at least one of a first bandwidth of the first BWP or a second bandwidth of the second BWP, or a frequency gap between the first BWP and the second BWP. The time gap may be different for a first timer of RAR window and a second timer of contention resolution window.

To the accomplishment of the foregoing and related ends, the one or more aspects include the features hereinafter fully described and particularly pointed out in the claims. The following description and the drawings set forth in detail some illustrative features of the one or more aspects. These features are indicative, however, of but a few of the various ways in which the principles of various aspects may be employed.

DETAILED DESCRIPTION

Figure 1:
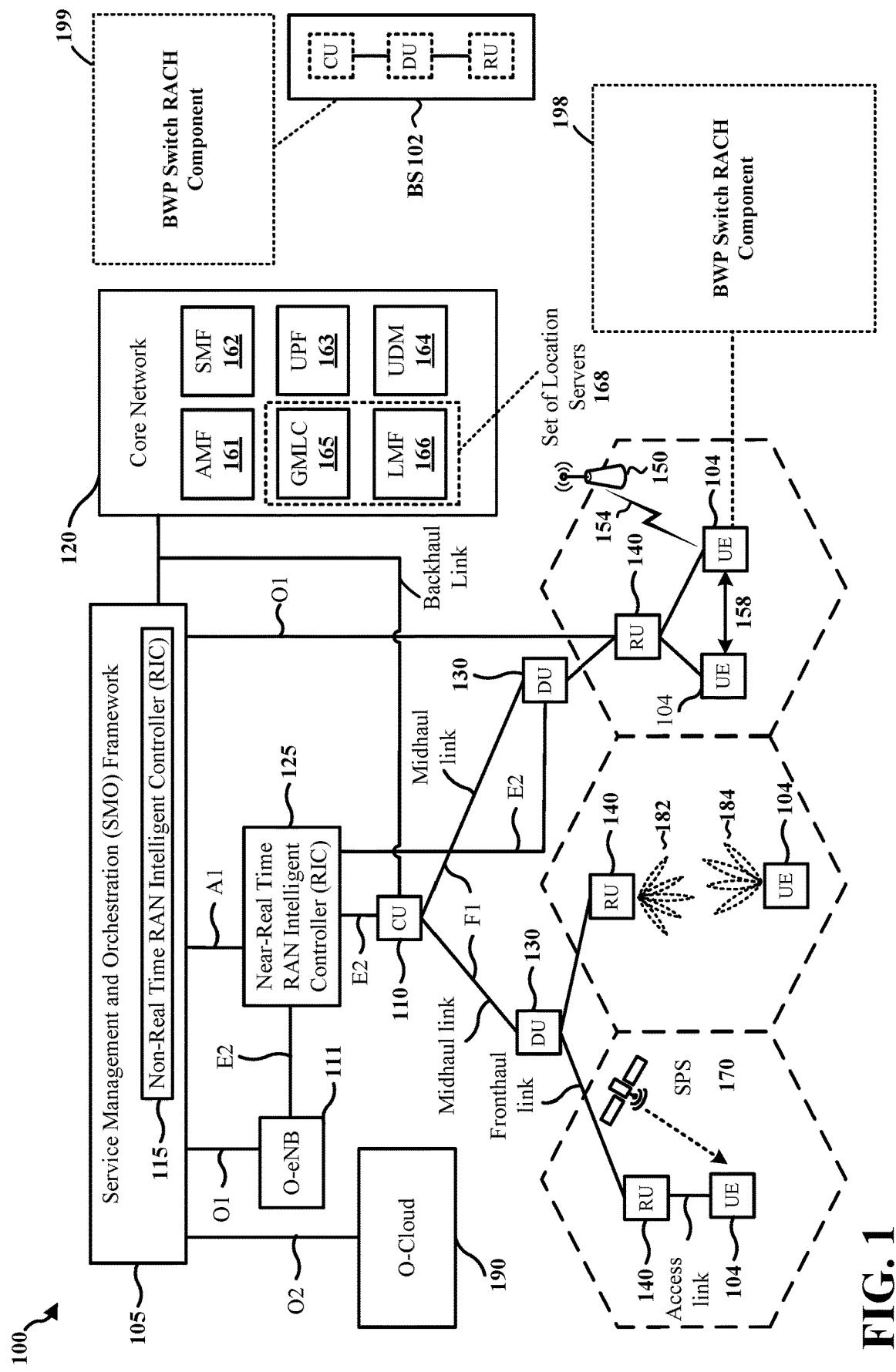
FIG. 1 is a diagram illustrating an example of a wireless communications system and an access network.

Various aspects relate generally to a bandwidth part (BWP) switching during an initial access procedure. Some aspects more specifically relate to adding a time gap after transmitting a random access message and before starting a timer to monitor for a response. In some examples, the random access message may be a Msg1 or a Msg3. In some examples, the time gap may be associated with at least one of the original BWP, the switched BWP, corresponding subcarrier spacings (SCSs), or a relationship therebetween.

Particular aspects of the subject matter described in this disclosure can be implemented to realize one or more of the following potential advantages. In some examples, the described techniques can be used to reduce the effect of BWP switching delay while also providing for more efficient monitoring at the UE for control signaling that may help to reduce power consumption at the UE.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

In one or more example aspects, implementations, or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, or use cases are described in this application by illustration to some examples, additional or different aspects, implementations or use cases may come about in many different arrangements and scenarios. Aspects, implementations, or use cases described herein may be implemented across many differing platform types, devices, systems, shapes, sizes, and packaging arrangements. For example, aspects, implementations, or use cases may come about via integrated chip implementations and other non-module-component based devices (for example, end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (for example, hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, that is, a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, that is, the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (that is, Central Unit-User Plane (CU-UP)), control plane functionality (that is, Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130 for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. A base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 or downlink (DL) (also referred to as forward link) transmissions from an RU 140 to a UE 104. The communication links may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, for example, in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and may effectively extend features of FR1 or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, or FR5, or may be within the EHF band.

The base station 102 and the UE 104 may each include multiple antennas, such as antenna elements, antenna panels, or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, or an RU. The set of base stations, which may include disaggregated base stations or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (for example, emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 or the serving base station 102. The signals measured may be based on one or more of a satellite positioning system (SPS) 170 (for example, one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (for example, barometric pressure sensor, motion sensor), NR enhanced cell ID (NR E-CID) methods, NR signals (for example, multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network or individually access the network.

Referring again to FIG. 1, in some aspects, the UE 104 may include a BWP switch random access channel (RACH) component 198 configured to transmit a first random access message to a base station 102 in a first BWP, switch from the first BWP to a second BWP, and start a timer associated with a second random access message from the base station in the second BWP following a time gap after transmission of the first random access message. In some aspects, the base station 102 may include a BWP switch RACH component 199 configured to receive a first random access message from a UE in a first BWP, and transmit a second random access message to the UE 104 in a second BWP following a time gap after reception of the first random access message.

Figures 2A, 2B, 2C, 2D:
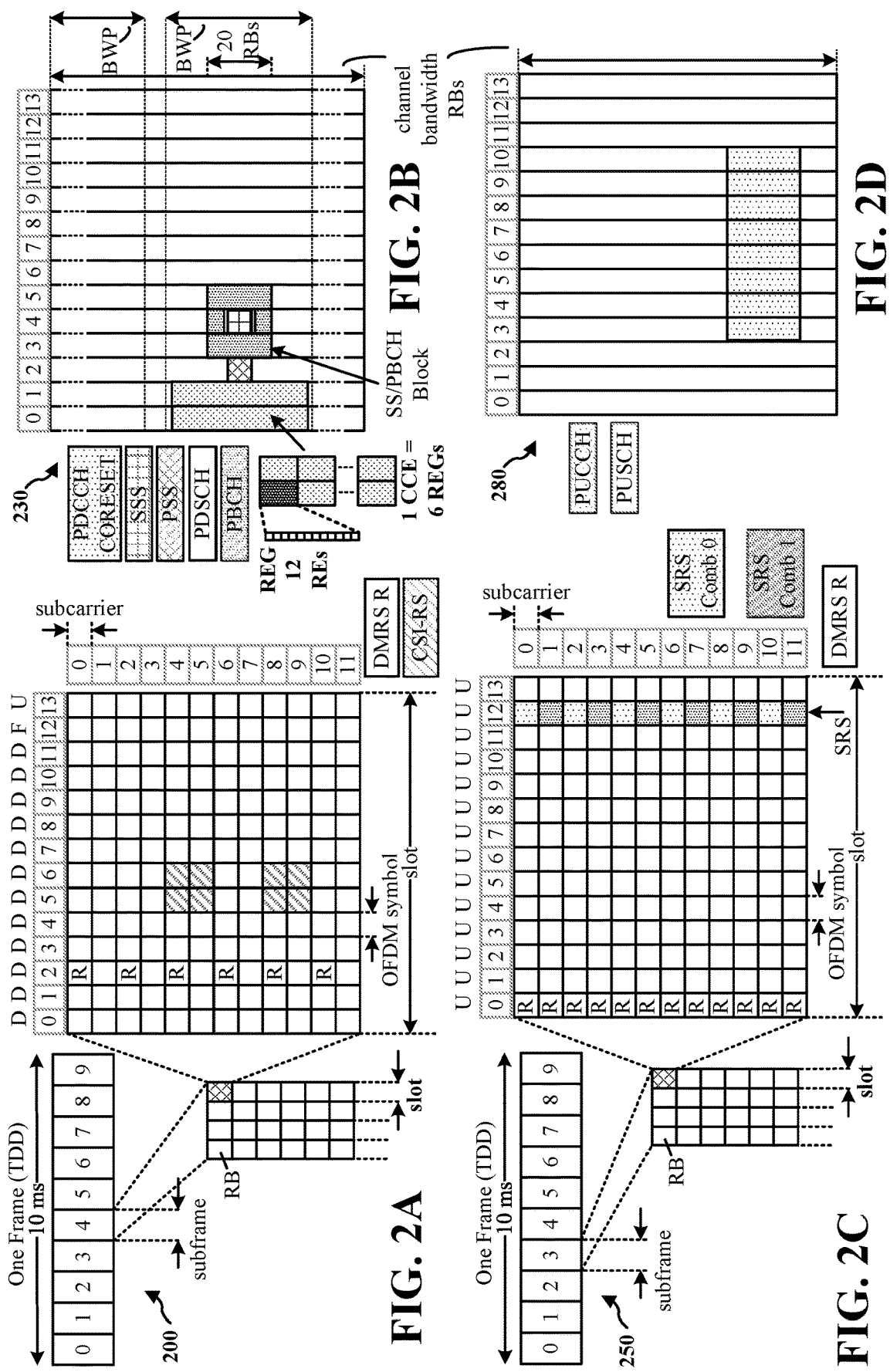
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram illustrating an example of a first frame, in accordance with various aspects of the present disclosure. That is, FIG. 2A is a diagram 200 illustrating an example of a first subframe within a 5G NR frame structure. FIG. 2B is a diagram illustrating an example of DL channels within a subframe, in accordance with various aspects of the present disclosure. That is, FIG. 2B is a diagram 230 illustrating an example of DL channels within a 5G NR subframe. FIG. 2C is a diagram illustrating an example of a second frame, in accordance with various aspects of the present disclosure. That is, FIG. 2C is a diagram 250 illustrating an example of a second subframe within a 5G NR frame structure. FIG. 2D is a diagram illustrating an example of UL channels within a subframe, in accordance with various aspects of the present disclosure. That is, FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

TABLE 1

| μ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. For normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (for example, 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (for example, common search space, UE-specific search space) during PDCCH monitoring occasions on the CORESET, where the PDCCH candidates have different DCI formats and different aggregation levels. Additional BWPs may be located at greater or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (that is, one or more HARQ ACK bits indicating one or more ACK or negative ACK (NACK)). The PUSCH carries data, and may additionally be used to carry a buffer status report (BSR), a power headroom report (PHR), or UCI.

Figure 3:
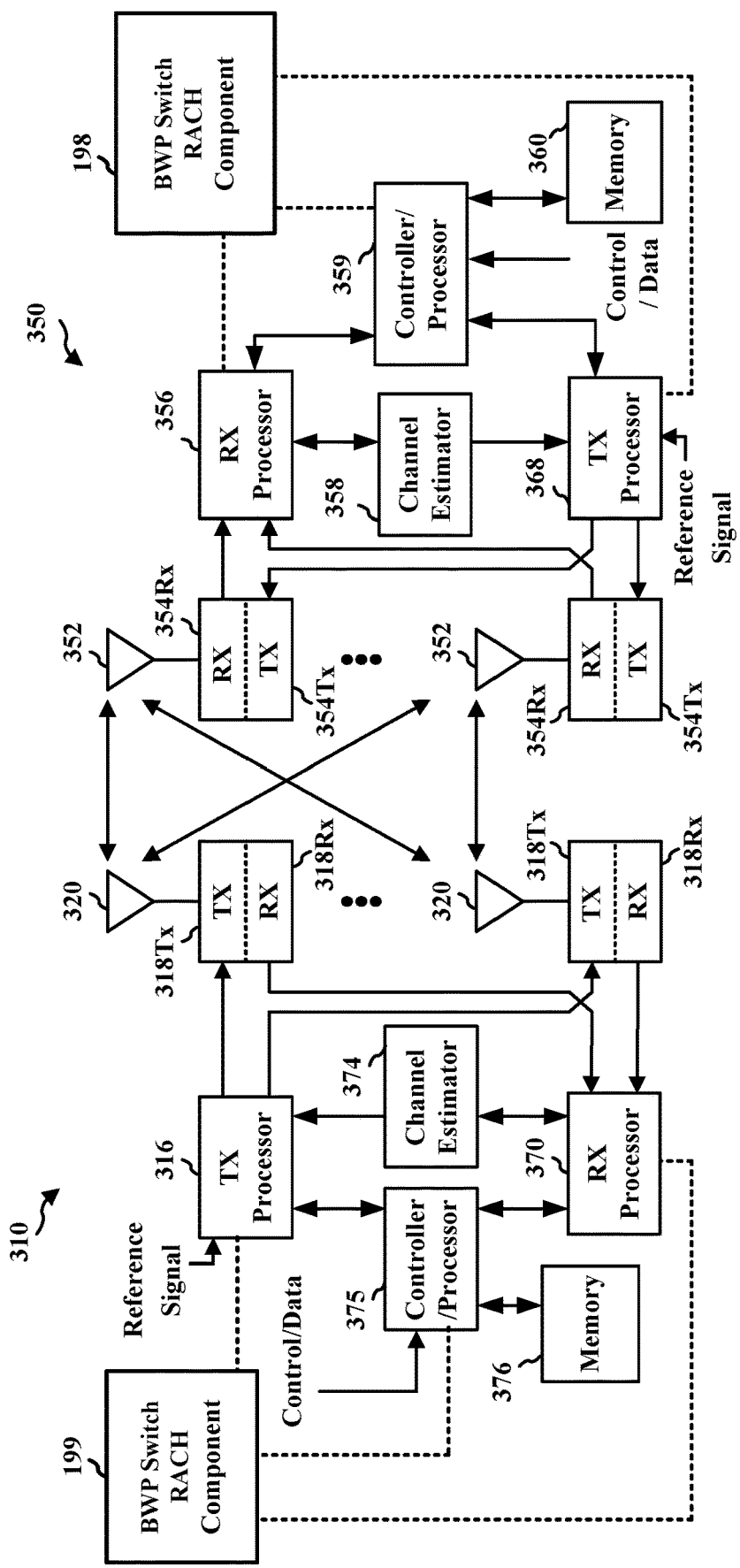
FIG. 3 is a diagram illustrating an example of a base station and user equipment (UE) in an access network.

FIG. 3 is a diagram illustrating an example of a base station and UE in an access network. That is, FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (for example, MIB, SIBs), RRC connection control (for example, RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (for example, binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (for example, pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (for example, MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK or NACK protocol to support HARQ operations.

At least one of the TX processor 368, the RX processor 356, and the controller/processor 359 may be configured to perform aspects in connection with the BWP switch RACH component 198 of FIG. 1. At least one of the TX processor 316, the RX processor 370, and the controller/processor 375 may be configured to perform aspects in connection with the BWP switch RACH component 199 of FIG. 1.

In higher frequency bands, such as a frequency band above 52.6 GHz, there may be added phase noise or a wider available bandwidth for wireless communication. A higher SCS may be used for the wireless communication in such higher frequency bands, for example to reduce phase noise or to utilize the wider available bandwidth. A higher SCS corresponds to a shorter symbol and slot duration. As described in connection with the example in Table 1 and FIGS. 2A-2D, an SCS is based on a numerology with the symbol length/duration being equal to 1/SCS. For example, an SCS of 120 kHz, 240 kHz, 480 kHz, or 960 kHz may be used for wireless communication in a frequency band above 52.6 GHz.

In some aspects, a bandwidth may be indicated for communication in a frequency range above 52.6 GHz for data and control channels or for reference signals. In some aspects, the wireless communication and SCS may be based on a normal CP, such as described in connection with Table 1 and FIGS. 2A-2D. A common design framework may be applied for the different SCS, including 480 kHz to 960 kHz, and having different timing aspects due to the different symbol length. An SCS of 120 kHz may be used for transmission of an SSB, with up to 64 SSB beams being used for licensed or unlicensed wireless communication in a frequency range above 52.6 GHz, for example. An example of an SSB is described in connection with FIG. 2B. In some aspects, one or more additional SCSs, such as 240 kHz, 480 kHz, or 960 kHz, may be used for the transmission of SSBs or for other initial access related signals and channels in an initial BWP. In some aspects, PRACH sequence lengths (L), such as L=139, L=571, or L=1151) may be supported, and random access channel occasions (ROs) may be configured to be non-consecutive in a time domain to provide for other wireless communication in a shared frequency spectrum.

A BWP, which may also be referred to as a carrier BWP, Bandwidth Part includes a contiguous set of physical resource blocks (PRBs), selected from a contiguous subset of the common resource blocks for a given numerology on a given frequency carrier.

Figure 4:
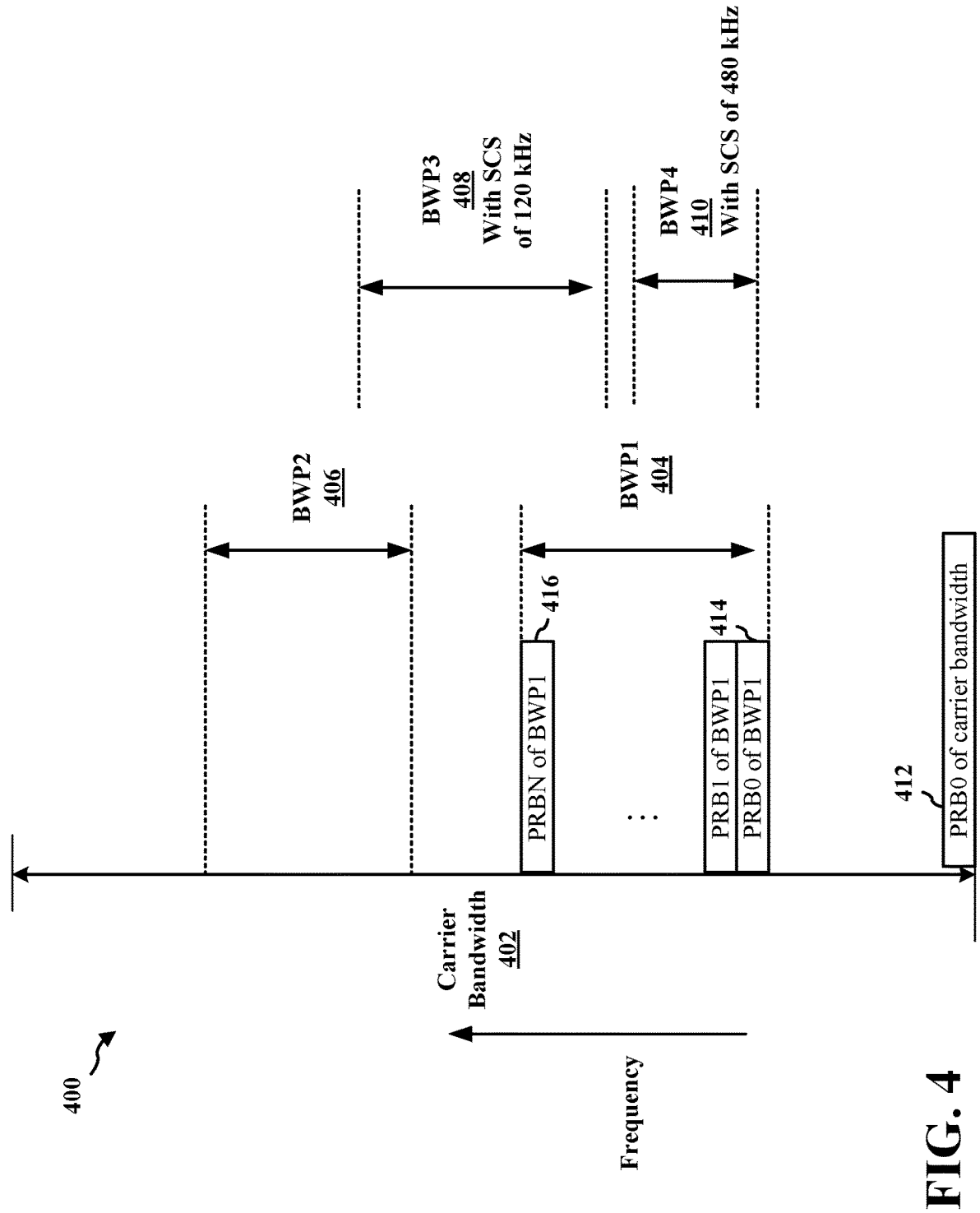
FIG. 4 is a diagram showing examples of multiple bandwidth parts (BWPs).

FIG. 4 is a diagram 400 showing examples of multiple BWPs. FIG. 4 illustrates carrier bandwidth 402 and multiple BWPs, including BWP1 404, BWP2 406, BWP3 408, and BWP4 410, that correspond to a subset of the carrier bandwidth. The PRBs of the carrier bandwidth 402 may be numbered from a reference PRB, such as the example of PRB0 412, as a common reference point for the BWPs relative to the carrier bandwidth. Each BWP may be based on an offset between the common reference point, such as PRB0 412 and a reference point of the particular BWP. Each BWP may span a frequency corresponding to one or more PRBs. For example, FIG. 4 illustrates BWP1 404 spanning PRB0 414 to PRBN 416. Different BWPs may be based on different SCSs. For example, BWP3 408 is illustrated in FIG. 4 as having a 120 kHz SCS, and BWP4 is illustrated as having a 480 kHz SCS.

A UE is not expected to receive PDSCH, PDCCH, CSI-RS, or a tracking reference signal (TRS) outside of an active downlink bandwidth part. Each downlink BWP may include at least one control resource set (CORESET) with a UE specific search space. At least one of the BWPs may include a CORESET with a common search space. A UE may not transmit PUSCH or PUCCH outside of an active uplink BWP.

A UE may receive a configuration for multiple BWPs, and one BWP may be active for the UE at a given time. The UE may switch the active BWP between different BWPs configured for the UE. The BWP switch may be triggered in any of various ways, including downlink control signaling activating a BWP, expiration of an inactivity timer, RRC signaling, initiation by a MAC entity, among other possible examples.

There may be a delay for a UE to switch between BWPs. Table 2 illustrates a set of example BWP switch delay times ($T_{BWPswitchDelay}$) in a number of slots. The BWP switch delay time may provide a time for the UE to switch between transmission or reception in one BWP to transmission or reception in a different BWP for different numerologies (u).

TABLE 2

| u | Slot length (ms) | BWP switch delay $T_{BWPswitchDelay}$ (slots) | |
|---|---|---|---|
| | | Type 1 | Type 2 |
| 0 | 1 | 1 | 3 |
| 1 | 0.5 | 2 | 5 |
| 2 | 0.25 | 3 | 9 |
| 3 | 0.125 | 6 | 18 |

The time for the Type 1 delay may depend on a UE capability. If the BWP switch involves changing SCS, the BWP switch delay may be determined by the smaller SCS between the SCS before BWP switch and the SCS after BWP switch. The BWP switch delay in Table 2 may be for a BWP switch indicated to the UE in DCI from a base station. In some aspects, an SCS change may be considered a BWP switch.

A UE may use a random access procedure in order to communicate with a base station. For example, the UE may use the random access procedure to request an RRC connection, to re-establish an RRC connection, or resume an RRC connection. A UE may use a random access procedure in order to communicate with a base station. For example, the UE may use the random access procedure to request an RRC connection, to re-establish an RRC connection, resume an RRC connection, among others. Random Access Procedures may include two different random access procedures, for example, The UE may use Contention Based Random Access (CBRA) may be performed when a UE is not synchronized with a base station, and the CFRA may be applied, for example, when the UE was previously synchronized to a base station 504. Both the procedures include transmission of a random access preamble from the UE to the base station. In CBRA, a UE may randomly select a random access preamble sequence, for example, from a set of preamble sequences. As the UE randomly selects the preamble sequence, the base station may receive another preamble from a different UE at the same time. CBRA provides for the base station to resolve such contention among multiple UEs. In CFRA, the network may allocate a preamble sequence to the UE rather than the UE randomly selecting a preamble sequence. This may help to avoid potential collisions with a preamble from another UE using the same sequence. CFRA may be referred to as "contention free" random access.

Figures 5A, 5B:
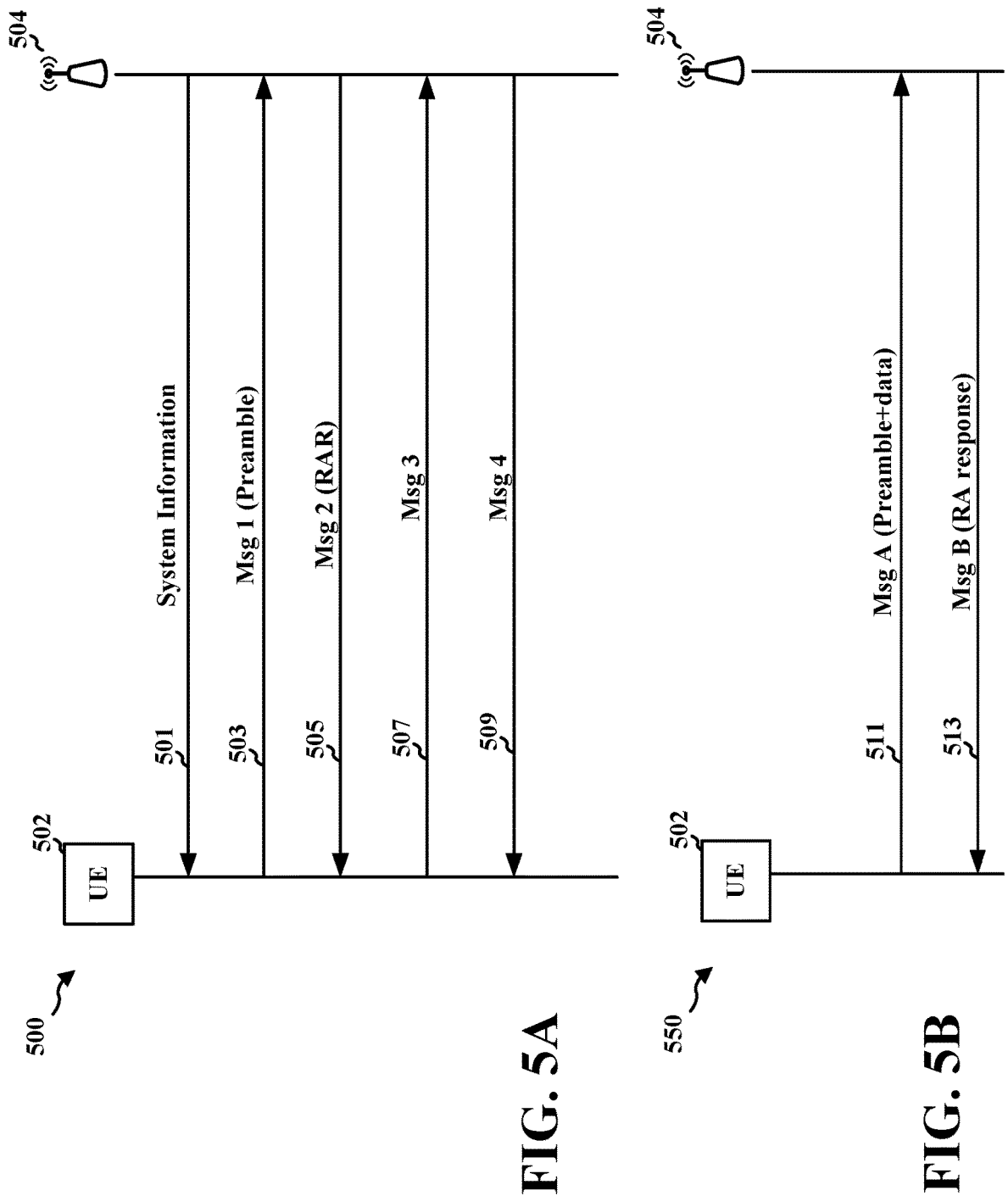
FIGS. 5A and 5B are flow diagrams illustrating an example random access procedure between a UE and a base station.

FIGS. 5A and 5B are flow diagrams illustrating an example random access procedure 500 between a UE 502 and a base station 504. The UE 502 may initiate the random access message exchange by sending, to the base station 504, a first random access message 503 (for example, Msg 1) including a preamble. Prior to sending the first random access message 503, the UE may obtain random access parameters, for example, including preamble format parameters, time and frequency resources, parameters for determining root sequences or cyclic shifts for a random access preamble, for example, in system information 501 from the base station 504. The preamble may be transmitted with an identifier, such as a Random Access RNTI (RA-RNTI). The UE 502 may randomly select a random access preamble sequence, for example, from a set of preamble sequences. If the UE 502 randomly selects the preamble sequence, the base station 504 may receive another preamble from a different UE at the same time. In some examples, a preamble sequence may be assigned to the UE 502.

The base station responds to the first random access message 503 by sending a second random access message 505 (for example Msg 2) using PDSCH and including a RAR. The RAR may include, for example, an identifier of the random access preamble sent by the UE, a time advance (TA), an uplink grant for the UE to transmit data, cell radio network temporary identifier (C-RNTI) or other identifier, or a back-off indicator. Upon receiving the RAR in the second random access message 505, the UE 502 may transmit a third random access message 507 (for example, Msg 3) to the base station 504, for example, using PUSCH, that may include a RRC connection request, an RRC connection re-establishment request, or an RRC connection resume request, depending on the trigger for the initiating the random access procedure. The base station 504 may then complete the random access procedure by sending a fourth random access message 509 (for example, Msg 4) to the UE 502, for example, using PDCCH for scheduling and PDSCH for the message. The fourth random access message 509 may include a random access response message that includes timing advancement information, contention resolution information, or RRC connection setup information. The UE 502 may monitor for PDCCH, for example, with the C-RNTI. If the PDCCH is successfully decoded, the UE 502 may also decode PDSCH. The UE 502 may send HARQ feedback for any data carried in the fourth random access message. If two UEs sent a same preamble at 703, both UEs may receive the RAR leading both UEs to send a third random access message 507. The base station 504 may resolve such a collision by being able to decode the third random access message from only one of the UEs and responding with a fourth random access message to that UE. The other UE, which did not receive the fourth random access message 509, may determine that random access did not succeed and may re-attempt random access. The fourth message may be referred to as a contention resolution message. The fourth random access message 509 may complete the random access procedure. The UE 502 may then transmit uplink communication or receive downlink communication with the base station 504 based on the RAR in the second random access message 505.

In some aspects, a single round trip cycle between the UE and the base station may be achieved in a 2-step RACH process 550, such as shown in FIG. 5B to reduce latency or control signaling overhead. Aspects of Msg 1 and Msg 3 may be combined in a single message, for example, which may be referred to as Msg A. The Msg A may include a random access preamble, and may also include a PUSCH transmission, for example, such as data. The MsgA preambles may be separate from the four step preambles, yet may be transmitted in the same random access occasions (ROs) as the preambles of the four step RACH procedure or may be transmitted in separate ROs. The PUSCH transmissions may be transmitted in PUSCH occasions (POs) that may span multiple symbols and PRBs. After the UE 502 transmits the Msg A 511, the UE 502 may wait for a response from the base station 504. Additionally, aspects of the Msg 2 and Msg 4 may be combined into a single message, which may be referred to as Msg B. Two step RACH may be triggered for reasons similar to a four-step RACH procedure. If the UE does not receive a response, the UE may retransmit the MsgA or may fall back to a four-step RACH procedure starting with a Msg 1. If the base station detects the Msg A, but fails to successfully decode the Msg A PUSCH, the base station may respond with an allocation of resources for an uplink retransmission of the PUSCH. The UE may fallback to the four step RACH with a transmission of Msg 3 based on the response from the base station and may retransmit the PUSCH from Msg A. If the base station successfully decodes the Msg A and corresponding PUSCH, the base station may reply with an indication of the successful receipt, for example, as a random access response 513 that completes the two-step RACH procedure. The Msg B may include the random access response and a contention-resolution message. The contention resolution message may be sent after the base station successfully decodes the PUSCH transmission.

In the random access channel procedure, the UE may transmit the RACH message to the base station and monitor, during a window of time, for the response from the base station based on the random access message transmitted to the base station. First, the UE may transmit the Msg 1 including a RACH preamble to the base station. The base station may receive the Msg 1 from the UE and transmit the Msg 2 including the RAR to the UE in response to the Msg 1 received from the UE. The RAR may be transmitted by the base station and received by the UE within a RAR window configured for the UE and the base station. Here, the window of time may be the RAR window. In one aspect, the UE may start monitoring the RAR window for the RAR (Msg 2) in an applicable CORESET within the RAR window starting after the RACH occasion (RO). That is, the UE may start a first timer configured for the RAR window after the RO, and the RAR window extend until the first expiration of the timer. The first timer may be referred to as the RAR window timer. The period of the RAR window may be configured by a SIB message including a parameter indicating the length of the RAR window, for example, rar-WindowLength. For example, the UE may start monitoring for the RAR (Msg 2) in an applicable CORESET of received PDCCH within the RAR window, the RAR window starting 1 symbol after the end of the RACH occasion (RO). That is, the UE may start a timer configured for the RAR window 1 symbol after the RO, and the RAR window may start 1 symbol after the RO and extend until the RAR window expiration of the timer.

In another aspect, the UE and the base station may request RRC connection and the base station may send a contention resolution message to the UE. The UE may transmit the Msg 3 including scheduled UL transmission to the base station. The base station may receive the Msg 3 from the UE, and transmit the Msg 4 including the contention resolution to the UE in response to the Msg 3 received from the UE. That is, the base station may assist the UE in contention resolution using the C-RNTI on the PDCCH or using the UE contention resolution identity IE on the PDSCH. The Msg 4 may be transmitted by the base station and received by the UE within a contention resolution window configured for the UE. Here, the window of time may be the contention resolution window. In one aspect, the UE may start monitoring the contention resolution window for the Msg 4 in the contention resolution window starting after the transmission of the Msg 3. That is, the UE may start a second timer configured for the contention resolution window after transmitting the Msg 3, and the contention resolution window may extend until the second expiration of the timer. The second timer may be referred to as the contention resolution window timer. The period of the contention resolution window may be configured by an RRC message including a parameter indicating the length of the contention resolution window, for example, ra-ContentionResolutionTimer. For example, the UE may start monitoring for the RAR (Msg 2) in an applicable CORESET within the RAR window, the RAR window starting 1 symbol after the end of the RACH occasion (RO). That is, the UE may start the contention window timer immediately after transmitting the Msg 3, and the RAR window may start immediately after the transmission of the Msg 3 and extend until the contention window expiration of the timer. The UE may monitor to decode PDCCH with TC-RNTI while the contention window timer is running, and look for DCI in the search space. If PDCCH is successfully decoded, the UE may decode PDSCH carrying the MAC-CE, set the C-RNTI as the TC-RNTI, and discard the contention window timer to consider the RACH procedure successful.

In some aspects, the UE may switch BWPs (which may include a change in SCS) after the UE transmits the RACH message to the base station and before the start of monitoring the window of time when the UE monitors for the response message from the base station. That is, the UE may transmit the RACH message to the base station based on a first SCS, and the base station may transmit the response message based on a second SCS that is different from the first SCS. In some aspects, the SCS change may be considered a BWP switch. That is, the SCS change may cause a BWP switch. The UE may switch BWPs after transmitting the RACH message to the base station and before starting to monitor for the response message from the base station during the window of time. That is, the RACH message transmitted from the UE to the base station may have a first BWP, and the response message from the base station may have a second BWP that is different from the first BWP.

In one aspect, the SCS may switch after the UE transmits the Msg 1 to the base station and before starting the RAR window for receiving the RAR from the base station. That is, the UE may transmit the Msg 1 having the first SCS to the base station, and the base station may transmit the Msg 2 having the second SCS to the UE. The UE may switch from the first BWP to the second BWP to monitor the RAR window to receive the RAR from the base station. For example, the Msg 1 may have the first SCS of 120 kHz and the Msg 2 including the RAR may have the second SCS of 480 kHz or 960 kHz. For example, the UE may switch the SCS from the first SCS to the second SCS and start monitoring the PDCCH 1 symbol after transmitting the Msg 1 to the base station.

In another aspect, the SCS may switch after the UE transmits the Msg 3 to the base station and before starting the contention resolution window for receiving the Msg 4 from the base station. That is, the UE may transmit the Msg 3 having the first SCS to the base station, and the base station may transmit the Msg 4 having the second SCS to the UE. The UE may switch from the first BWP to the second BWP to monitor for the RAR from the base station during the contention resolution window. For example, the Msg 3 (or the Msg 1 or the Msg 2) may have the first SCS of 120 kHz and the Msg 2 including the RAR may have the second SCS of 480 kHz or 960 kHz. For example, the UE may start monitoring the PDCCH immediately after transmitting the Msg 3 to the base station.

The SCS change may be considered as the BWP switch, and the UE may apply a time delay, for example, 1 ms-3 ms, to accommodate for the SCS switch or the BWP switch (that is, an SCS switch delay or a BWP switch delay). In one aspect, the SCS switching gap may be absorbed by, or may occur fully within, the RAR window for receiving the Msg 2 or the contention resolution window for receiving the Msg 4. The time to perform the BWP switch, such may be referred to as the switching gap, reduces the portion of the RAR window or the contention resolution window that the UE may use to monitor for a random access response. The UE may try to monitor for a random access response message based on the RAR window or the contention resolution window having a size to accommodate the switching gap, for example, 1 ms-3 ms. The attempt to decode the PDCCH over such a time period may increase power consumption at the UE.

Increased SCS may result in an increase in the length of the SCS switching gap, and the longer SCS switching gap absorbed into the RAR window or the contention resolution window may have increased impact. In one aspect, the SCS switching gap of increased SCS absorbed into the RAR window or the contention window may take up increased number of slots within the RAR window or the contention resolution window, and the RAR window or the contention resolution window may have reduced flexibility to transmit the PDCCH to the UE, respectively. In another aspect, the SCS switching gap of increased SCS absorbed into the RAR window or the contention window may take up increased number of slots within the RAR window or the contention resolution window that does not carry the PDCCH to the UE, and the UE consume additional power to attempt to decoding a random access response during parts of the RAR window or the contention resolution window that do not carry the PDCCH. Higher SCSs have shorter time slots. The switching gap uses a larger number of slots at the higher SCSs, which may correspond to a larger portion of the RAR window or the contention window. The use of relatively larger portions of the windows for a switching gap limits flexibility in scheduling wireless communication with the UE and may lead to more frequency PDCCH monitoring by the UE.

Figure 6:
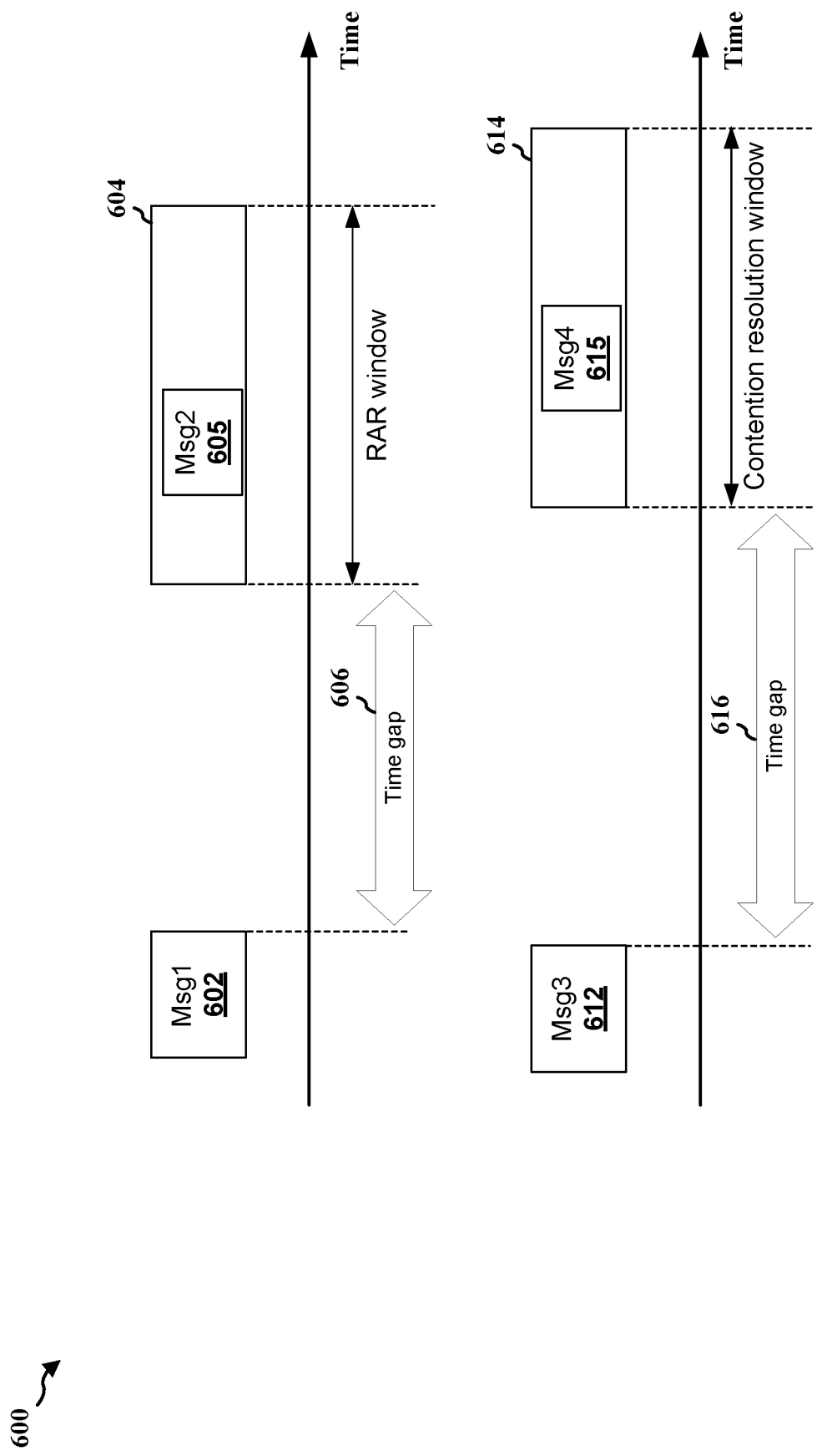
FIG. 6 is a timing diagram associated with a random access channel (RACH) procedure between a UE and a base station.

FIG. 6 is a timing diagram associated with a RACH procedure between a UE and a base station. The RACH procedures 600 may be a Msg 1 602, a RAR window 604 for receiving a Msg 2 605, a Msg 3 612, or a contention resolution window 614 for receiving a Msg 4 615. The Msg 1 602 may include the RACH preamble transmitted by the UE to the base station. The Msg 2 605 may include the RAR transmitted by the base station to the UE. The Msg 3 612 may include the scheduled UL transmission from the UE to the base station. The Msg 4 615 may include the contention resolution transmitted by the base station to the UE.

In some aspects, the SCS may switch after the UE transmits the RACH message to the base station and before the start of monitoring the window of time to receive the response message from the base station, and the UE and the base station may add a delay or a time gap before the start of the following RACH procedure windows or timers. The SCS may switch after the UE transmitting the RACH message to the base station and before the start of monitoring the window of time to receive the response message from the base station the start of monitoring the window of time to receive the response message from the base station, and the UE and the base station may add the time gap 606 before the start of monitoring the window of time to receive the response message from the base station. In one aspect, the SCS may switch after the UE transmits the Msg 1 602 to the base station and before starting the RAR window 604 for receiving the RAR from the base station, and the UE may add the time gap 606 before the RAR window timer starts. That is, the UE may transmit the Msg 1 602 having the first SCS to the base station, and the base station may transmit, to the UE, the Msg 2 605 having the second SCS in the RAR window 604 starting after adding the time gap 606. The UE may, after transmitting the Msg 1 602 to the base station, switch from the first BWP to the second BWP, add the time gap 606 before starting the RAR window 604 to monitor the PDCCH received from the base station to receive the Msg 2 605 including the RAR. For example, the UE may switch the SCS from the first SCS to the second SCS, apply the time gap 606+1 symbol after transmitting the Msg 1 602 to the base station, start the RAR window timer after the time gap 606+1 symbol after transmitting the Msg 1 602 to the base station, and monitor the PDCCH in the RAR window before the RAR window expiration of the timer.

In another aspect, the SCS may switch after the UE transmits the Msg 3 612 to the base station and before starting the contention resolution window 614 for receiving the RAR from the base station, and the UE may add the time gap 616 before the contention resolution window timer starts. That is, the UE may transmit the Msg 3 612 having the first SCS to the base station, and the base station may transmit, to the UE, the Msg 4 615 having the second SCS in the contention resolution window 614 starting after adding the time gap 616. The UE may, after transmitting the Msg 3 612 to the base station, switch from the first BWP to the second BWP, add the time gap 616 before starting the contention resolution window 614 to monitor the PDCCH received from the base station to receive the Msg 4 615. For example, the UE may switch the SCS from the first SCS to the second SCS, apply the time gap 616 after transmitting the Msg 3 612 to the base station, start the contention resolution window timer after the time gap 616 after transmitting the Msg 3 612 to the base station, and monitor the PDCCH in the contention resolution window before the contention resolution window expiration of the timer.

In some aspects, the length of the time gap may be determined based on various factors. In one aspect, the base station may indicate the time gap for the UE. That is, the base station may determine the time gap based on the BWP change from a first BWP to a second BWP, and transmit a configuration of the time gap to the UE. The base station and the UE may apply the time gap based on the configuration of the time gap transmitted by the base station.

In another aspect, the configuration of the time gap may be defined, for example, in a telecommunication standard, for the UE and the base station, and the UE and the base station may determine the time gap based on the defined configuration of the time gap. For one example, the defined configuration of the time gap may include a matrix or a table of the time gap with respect to the first SCS, the second SCS, the first BWP, or the second BWP. For another example, the defined configuration of the time gap may include a formula for determining the time gap based on the first SCS, the second SCS, the first BWP, or the second BWP.

The UE may request the time gap to the base station. That is, the UE may determine and suggest the time gap to the base station. In one aspect, the UE may determine the time gap based on the UE capability and request the time gap to the base station. For example, the UE may have the capability to switch the SCS faster than other UEs, and the UE may request, to the base station, a time gap that is shorter than the time gap for other UEs. The base station may receive the request from the UE and may accept or determine a different time gap. For example, the base station may decline the time gap candidate if the time gap candidate is not applicable. In one aspect, the base station may transmit a configuration of the time gap to confirm the acceptance of the time gap candidate. In another aspect, the base station may transmit a configuration of a time gap different from the time gap candidate.

In another aspect, the time gap may be a function of the BWP switch delay. Based on the SCS switching or the BWP switching, the SCS switching gap or the BWP switch delay may be applied by the base station or the UE to accommodate for the SCS switch or the BWP switch. The time gap may be determined based on the BWP switch delay. In an example, the BWP switch delay may be 1 ms-3 ms, and the time gap may be determined as a half of the BWP switch delay. In another example, time gap may be determined to be 1 ms shorter than the BWP switch delay.

In some aspects, the time gap may depend on the source SCS (or a source BWP) and the target SCS (or a source BWP). That is, the length of the time gap to be added between switching from the first SCS (or the first BWP) to the second SCS (or the second BWP) may depend on at least one of the first SCS or the second SCS. In one aspect, the time gap may be determined based on a relationship between the first SCS and the second SCS. For one example, the time gap may be determined based on difference between the second SCS and the first SCS, which may be represented as (second SCS)−(first SCS). For another example, the time gap may be determined based on a ratio of the second SCS to the first SCS, which may be represented as $$\frac{(\text{second } SCS)}{(\text{first } SCS)}.$$

However, the examples of the current disclosure are not limited thereto, and the time gap may be determined based on any relationship between the first SCS and the second SCS.

In some aspects, the time gap may be determined based on bandwidths of at least one BWP including the first BWP or the second BWP. In one aspect, the time gap may be determined based on at least one of a first bandwidth of the first BWP or a second bandwidth of the second BWP. For one example, the time gap may be determined based on the first bandwidth of the first BWP before the BWP switching. For another example, the time gap may be determined based on the second bandwidth of the second BWP after the BWP switching. In another aspect, the time gap may be determined based on a relationship between the first bandwidth and the second bandwidth. For one example, the time gap may be determined based on the bandwidth difference between the second BWP and the first BWP, which may be represented as (second bandwidth)−(first bandwidth). For another example, the time gap may be determined based on a ratio of the second bandwidth to the first bandwidth, which may be represented as $$\frac{(\text{second bandwidth})}{(\text{first bandwidth})}.$$

However, the examples of the current disclosure are not limited thereto, and the time gap may be determined based on any relationship between the first BWP and the second BWP.

In some aspects, the time gap may be determined based on a frequency gap between the first BWP and the second BWP. The frequency gap may be determined based on respective reference frequencies of the first BWP and the second BWP. For one example, the frequency location gap may be a frequency location gap determined as the frequency gap between the center frequency of the first BWP and the center frequency of the second BWP. For another example, the frequency location gap may be determined as the frequency gap between the upper limit of the first BWP and the upper limit of the second BWP. However, the examples of the current disclosure are not limited thereto, and the time gap may be determined based on a relationship between any reference frequency of the first BWP and the second BWP.

The time gap may be configured the same or different for the RAR window and the contention resolution window. In one aspect, the time gap may be determined the same way for the RAR window and the contention resolution window. For one example, the same rule or formula may be applied to determine the time gap for the RAR window and the contention resolution window. For another example, the same table or matrix may be used to determine the time gap for the RAR window and the contention resolution window. In another aspect, the time gap may be determined differently for the RAR window and the contention resolution window. For one example, the rule or formula for determining the time gap may be different for the RAR window and the contention resolution window. For another example, different tables or different matrix may be used to determine the time gap for the RAR window and the contention resolution window. For another example, a rule or formula may be used to determine the time gap for one of the RAR window or the contention resolution window, and a table or matrix may be used to determine the time gap for the other of the RAR window or the contention resolution window.

Figure 7:
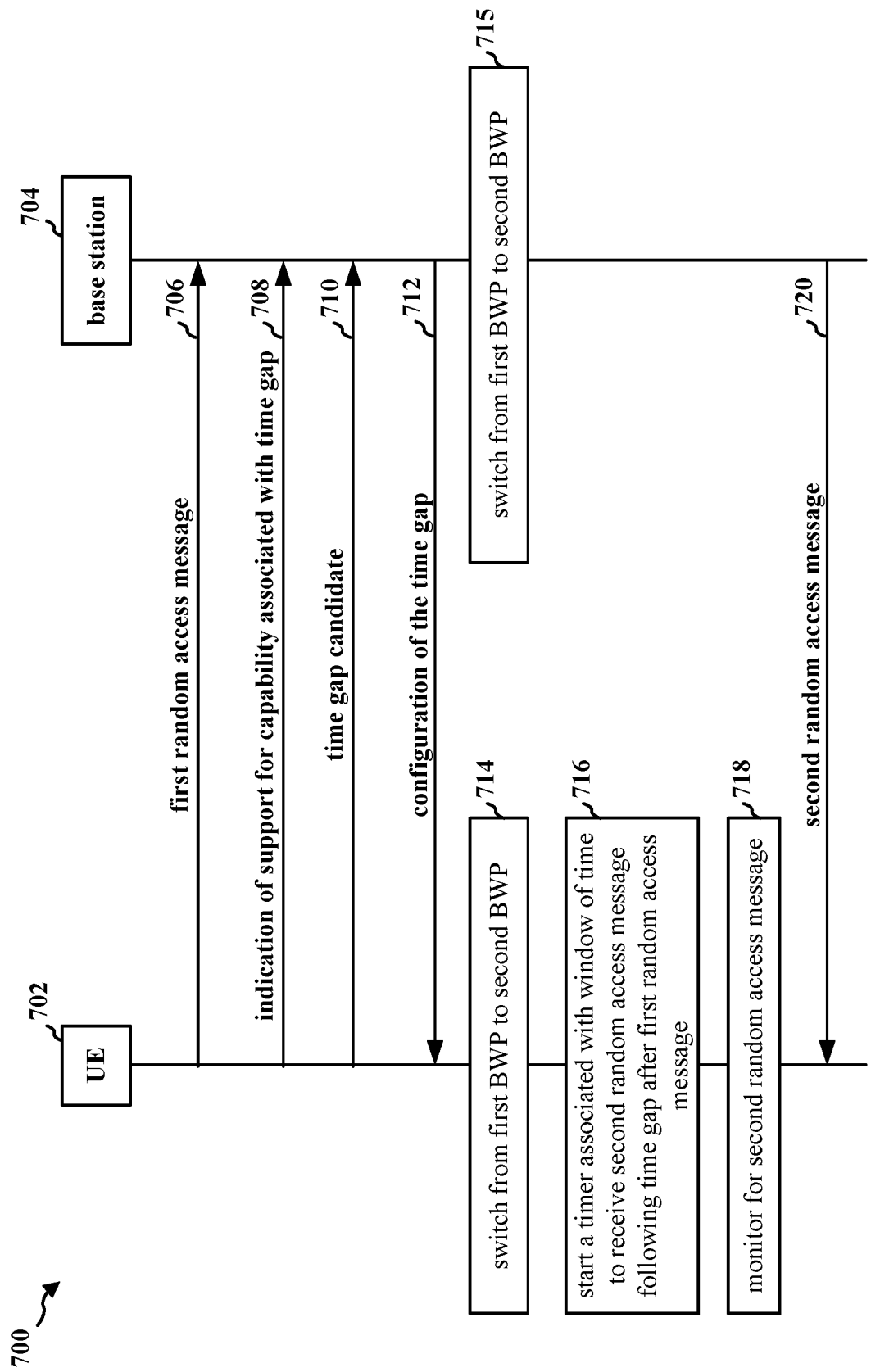
FIG. 7 is a flow diagram illustrating an example random access procedure between a base station and a UE that supports BWP switching in accordance with aspects of the present disclosure.

FIG. 7 is a flow diagram 700 illustrating an example random access procedure between a base station and a UE that supports BWP switching in accordance with aspects of the present disclosure. The flow diagram 700 may include a UE 702 and a network entity 704. The UE 702 may transmit a first random access message to a network entity 704 in a first BWP, switch from the first BWP to a second BWP, and start a timer associated with a second random access message from the network entity 704 in the second BWP following a time gap after transmission of the first random access message. The network entity 704 may receive a first random access message from a UE 702 in a first BWP, and transmit a second random access message to the UE 702 in a second BWP following a time gap after the first random access message.

At 706, the UE 702 may transmit the first random access message to the network entity 704 in the first BWP, and the network entity 704 may receive the first random access message from the UE 702 in the first BWP. The first random access message may be a Msg 1, or the first random access message may be a Msg 3.

The BWP may switch after transmitting the first random access message to the network entity 704 and before receiving a second random access message from the network entity 704. Here, the second random access message may be a Msg 2 in response to the Msg 1 or a Msg 4 in response to the Msg 3. The UE 702 may apply a time gap after transmitting the first random access message and before starting a timer associated with the second random access message. In one aspect, the switch from the first BWP to the second BWP may correspond to or based on an SCS change from a first SCS to a second SCS.

In one aspect, the timing gap maybe determined based on a configuration defined for the network entity 704 and the UE 702. That is, the configuration of the time gap may be defined, for example, in a telecommunication standard, for the UE 702 and the network entity 704, and the UE 702 and the network entity 704 may determine the time gap based on the defined configuration of the time gap. For one example, the defined configuration of the time gap may include a matrix or a table of the time gap with respect to the SCSs of the first random access message and the second random access message or the BWPs of the first random access message and the second random access message. For another example, the specified configuration of the time gap may include a formula for determining the time gap based on at least one SCS of the first random access message or the second random access message or based on the first BWP or the second BWP.

In another aspect, the time gap may be based on a function of BWP switch delay for switching the BWP from the first BWP to the second BWP. That is, the time gap may be based on the BWP switch delay provided to accommodate for the BWP switch. In another aspect, the time gap may be based on a relationship between a first SCS of the first BWP and a second SCS of the second BWP. For one example, the time gap may be determined based on a difference between the first SCS and the second SCS. For another example, the time gap may be determined based on a ratio of the second SCS to the first SCS.

In another aspect, the time gap may be based on at least one of a first bandwidth of the first BWP or a second bandwidth of the second BWP. For one example, the time gap may be determined based on the first bandwidth of the first BWP. For another example, the time gap may be determined based on the second bandwidth of the second BWP. Also, the time gap may be determined based on a relationship between the first bandwidth of the first BWP and the second bandwidth of the second BWP. For one example, the time gap may be determined based on a difference between the first bandwidth and the second bandwidth. For another example, the time gap may be determined based on a ratio of the second bandwidth to the first bandwidth. In another aspect, the time gap may be based on a frequency gap between the first BWP and the second BWP. For example, the frequency gap may be a frequency location gap determined as the frequency gap between the center frequency of the first BWP and the center frequency of the second BWP.

In some aspects, the timer may include a first timer and a second timer. The window of time associated with the first timer may be the RAR window for receiving the Msg 2, and the window of time associated with the second timer may be the contention resolution window for receiving the Msg 4. Here, the first timer may be configured to start following the first time gap and the second timer is configured to start following the second time gap. In one aspect, the first time gap associated with the first timer associated with the RAR window for receiving the Msg 2 may be different from the second time gap associated with second timer associated with the contention resolution window for receiving a Msg 4. In another aspect, the first time gap associated with the first timer associated with the RAR window for receiving the Msg 2 may be same with the second time gap associated with the second timer associated with the contention resolution window for receiving a Msg 4.

At 708, the UE 702 may transmit an indication of support for a capability associated with a BWP switch delay, and the network entity 704 may receive the indication of support for the capability associated with the BWP switch delay. The time gap may be based on the support for the capability associated with the BWP switch delay received from the UE 702.

At 710, the UE 702 may transmit a time gap candidate to the network entity 704, and the network entity 704 may receive the time gap candidate from the UE 702. The time gap may be determined based on the time gap candidate.

At 712, the network entity 704 may transmit a configuration of the time gap to the UE 702, and the UE 702 may receive the configuration of the time gap from the network entity 704. In one aspect, the time gap may be determined based on the configuration of the time gap transmitted by the network entity 704. In another aspect, the network entity 704 may determine the time gap and the configuration of the time gap indicates the time gap to the UE 702.

At 714, the UE 702 may switch from the first BWP to the second BWP after transmitting the first random access message at 706, and at 715, the network entity 704 may switch from the first BWP to the second BWP after receiving the first random access message at 706. The switching to the second BWP may be based on the configuration of the time gap received from the network entity 704 at 712. In one aspect, the switch from the first BWP to the second BWP may correspond to or be based on an SCS change from a first SCS to a second SCS.

At 716, the UE 702 may start a timer following a time gap after transmission of the first random access message in the first BWP, the timer associated with a window of time for receiving a second random access message from the network entity 704 in the second BWP. In one aspect, the first random access message may be a Msg 1, the window of time may be a RAR window for receiving the Msg 2 in response to the Msg 1 from the network entity 704, the time gap may be a first time gap, the timer may be a RAR window timer, and the RAR window may extend until the expiration of the RAR window timer. For example, the RAR window timer may start after the first time gap, and the RAR window may extend until the expiration of the RAR window timer. In another aspect, the first random access message may be a Msg 3, the window of time may be a contention resolution window for receiving the Msg 4 in response to the Msg 3 from the network entity 704, the time gap may be a second time gap, the timer may be a contention resolution window timer, and the contention resolution window may extend until the expiration of the contention resolution window timer. For example, the contention resolution window timer may start after the second time gap, and the contention resolution window may extend until the expiration of the contention resolution window timer.

At 718, the UE 702 may monitor for the second random access message within the window of time to receive the second random access message from the network entity 704 in response to the first random access message transmitted to the network entity 704. The UE 702 may monitor for the second random access message while the timer at 716 runs prior to an expiration of the timer at 716. In one aspect, the UE 702 may monitor the RAR window for the Msg 2 after transmitting the Msg 1, the RAR window starting after the time gap and extending until the expiration of the timer at 716. In another aspect, the UE 702 may monitor the contention resolution window for the Msg 4 after transmitting the Msg 3, the contention resolution window starting after the time gap and extending until the expiration of the timer at 716.

The network entity 704 may transmit the second random access message after expiration of the timer. In some aspects, the time gap may include a first time gap and a second time gap, where the first time gap may be added after reception of the Msg 1 and the Msg 2 is transmitted following the first time gap, and where the second time gap may be added after reception of the Msg 3 and the Msg 4 is transmitted following the second time gap. In one example, the first random access message may be the Msg 1, the second random access message may be the Msg 2, and the time gap may be a first time gap, and the network entity 704 may transmit the Msg 2 after the expiration of the first timer. In another example, the first random access message may be the Msg 3, the second random access message may be the Msg 4, and the time gap may be a second time gap, and the network entity 704 may transmit the Msg 4 after the expiration of the second timer.

At 720, the network entity 704 may transmit the second random access message to the UE 702 in the second BWP following the time gap after the first random access message, and the UE 702 may receive the second random access message from the network entity 704 in the second BWP following the time gap after transmitting the first random access message. In one aspect, the first random access message may include the Msg 1, and the second random access message may include the Msg 2 in response to the Msg 1, where the Msg 2 is transmitted to the UE 702 within the RAR window configured after the time gap. In another aspect, the first random access message may be a Msg 3, and the second random access message may include the Msg 4 in response to the Msg 3, where the Msg4 is transmitted to the UE 702 within the contention resolution window configured after the time gap.

Figure 8:
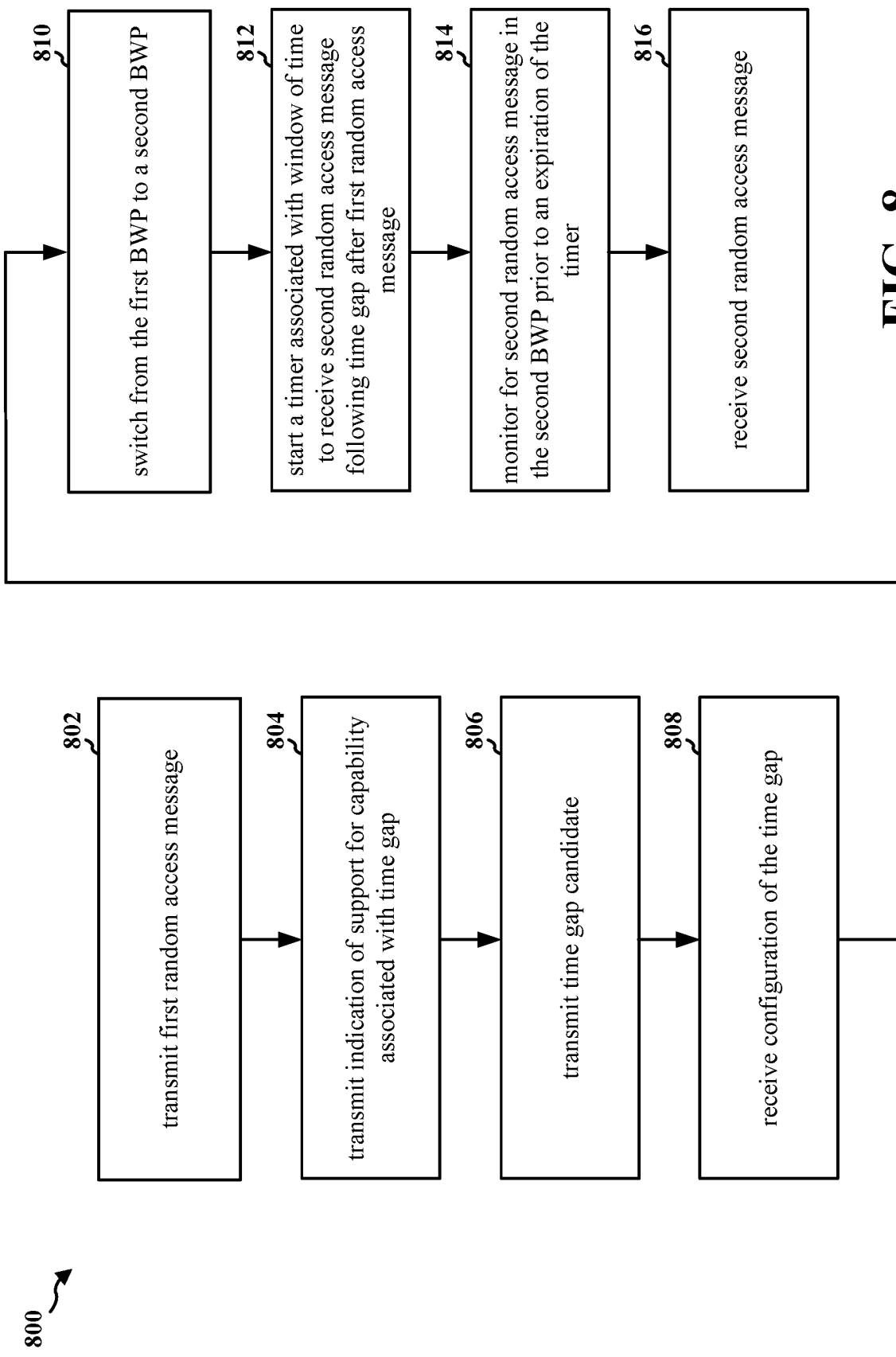
FIG. 8 is a flowchart illustrating a method of wireless communication that supports BWP switching.

FIG. 8 is a flowchart 800 illustrating a method of wireless communication that supports BWP switching. That is, FIG. 8 is the flowchart 800 illustrating the method of wireless communication performed by a UE that supports BWP switching in accordance with some aspects of the present disclosure. The method may be performed by a UE (for example, the UE 104; the apparatus 1204). The UE may support BWP switching in accordance with some aspects of the present disclosure. The UE may transmit a first random access message to a network entity in a first BWP, switch from the first BWP to a second BWP, and start a timer associated with the window of time to receive a second random access message from the network entity in the second BWP following a time gap after transmission of the first random access message.

At 802, the UE may transmit the first random access message to the network entity in the first BWP. The first random access message may be a Msg 1, or the first random access message may be a Msg 3. For example, at 706, the UE 702 may transmit the first random access message to the network entity 704 in the first BWP. Furthermore, 802 may be performed by a BWP switch RACH component 198.

The BWP may switch after transmitting the first random access message to the network entity and before receiving a second random access message from the network entity. Here, the second random access message may be a Msg 2 in response to the Msg 1 or a Msg 4 in response to the Msg 3. The UE may apply a time gap after transmitting the first random access message and before starting a timer associated with the window of time to receive the second random access message. In one aspect, the switch from the first BWP to the second BWP may correspond to or be based on an SCS change from a first SCS to a second SCS.

In one aspect, the timing gap maybe determined based on a configuration defined for the network entity and the UE. That is, the configuration of the time gap may be defined, for example, in a telecommunication standard, for the UE and the network entity, and the UE and the network entity may determine the time gap based on the defined configuration of the time gap. For one example, the defined configuration of the time gap may include a matrix or a table of the time gap with respect to the SCSs of the first random access message and the second random access message or the BWPs of the first random access message and the second random access message. For another example, the specified configuration of the time gap may include a formula for determining the time gap based on at least one SCS of the first random access message or the second random access message or based on the first BWP or the second BWP.

In another aspect, the time gap may be based on a function of BWP switch delay for switching the BWP from the first BWP to the second BWP. That is, the time gap may be based on the BWP switch delay provided to accommodate for the BWP switch. In another aspect, the time gap may be based on a relationship between a first SCS of the first BWP and a second SCS of the second BWP. For one example, the time gap may be determined based on a difference between the first SCS and the second SCS. For another example, the time gap may be determined based on a ratio of the second SCS to the first SCS.

In another aspect, the time gap may be based on at least one of a first bandwidth of the first BWP or a second bandwidth of the second BWP. For one example, the time gap may be determined based on the first bandwidth of the first BWP. For another example, the time gap may be determined based on the second bandwidth of the second BWP. Also, the time gap may be determined based on a relationship between the first bandwidth of the first BWP and the second bandwidth of the second BWP. For one example, the time gap may be determined based on a difference between the first bandwidth and the second bandwidth. For another example, the time gap may be determined based on a ratio of the second bandwidth to the first bandwidth. In another aspect, the time gap may be based on a frequency gap between the first BWP and the second BWP. For example, the frequency gap may be a frequency location gap determined as the frequency gap between the center frequency of the first BWP and the center frequency of the second BWP.

In some aspects, the timer may include a first timer and a second timer. The window of time associated with the first timer may be the RAR window for receiving the Msg 2, and the window of time associated with the second timer may be the contention resolution window for receiving the Msg 4. Here, the first timer may be configured to start following the first time gap and the second timer is configured to start following the second time gap. In one aspect, the first time gap associated with the first timer associated with the RAR window for receiving the Msg 2 may be different from the second time gap associated with second timer associated with the contention resolution window for receiving a Msg 4. In another aspect, the first time gap associated with the first timer associated with the RAR window for receiving the Msg 2 may be same with the second time gap associated with the second timer associated with the contention resolution window for receiving a Msg 4.

At 804, the UE may transmit an indication of support for a capability associated with a BWP switch delay. The time gap may be based on the support for the capability associated with the BWP switch delay received from the UE. For example, at 708, the UE 702 may transmit, to the network entity 704, an indication of support for a capability associated with a BWP switch delay. Furthermore, 804 may be performed by the BWP switch RACH component 198.

At 806, the UE may transmit a time gap candidate to the network entity. The time gap may be determined based on the time gap candidate. For example, at 710, the UE 702 may transmit a time gap candidate to the network entity 704. Furthermore, 806 may be performed by the BWP switch RACH component 198.

At 808, the UE may receive the configuration of the time gap from the network entity. In one aspect, the time gap may be determined based on the configuration of the time gap transmitted by the network entity. In another aspect, the network entity may determine the time gap and the configuration of the time gap indicates the time gap to the UE. For example, at 712, the UE 702 may receive the configuration of the time gap from the network entity 704. Furthermore, 808 may be performed by the BWP switch RACH component 198.

At 810, the UE may switch from the first BWP to the second BWP. The switching to the second BWP may be based on the configuration of the time gap received from the network entity at 808. In one aspect, the switch from the first BWP to the second BWP may correspond to or be based on an SCS change from a first SCS to a second SCS. For example, at 714, the UE 702 may switch from the first BWP to the second BWP. Furthermore, 810 may be performed by the BWP switch RACH component 198.

At 812, the UE may start a timer following a time gap after transmission of the first random access message in the first BWP, the timer associated with a window of time for receiving a second random access message from the network entity in the second BWP. In one aspect, the first random access message may be a Msg 1, and the window of time may be a RAR window for receiving the Msg 2 in response to the Msg 1 from the network entity, the time gap may be a first time gap, the timer may be a RAR window timer, and the RAR window may extend until the expiration of the RAR window timer. For example, the RAR window timer may start after the first time gap, and the RAR window may extend until the expiration of the RAR window timer. In another aspect, the first random access message may be a Msg 3, the window of time may be a contention resolution window for receiving the Msg 4 in response to the Msg 3 from the network entity, the time gap may be a second time gap, the timer may be a contention resolution window timer, and the contention resolution window may extend until the expiration of the contention resolution window timer. For example, the contention resolution window timer may start after the second time gap, and the contention resolution window may extend until the expiration of the contention resolution window timer. For example, at 716, the UE 702 may start a timer following a time gap after transmission of the first random access message in the first BWP, the timer associated with a window of time for receiving a second random access message from the network entity 704 in the second BWP. Furthermore, 812 may be performed by the BWP switch RACH component 198.

At 814, the UE may monitor for the second random access message within the window of time to receive the second random access message from the network entity in response to the first random access message transmitted to the network entity. The UE may monitor for the second random access message while the timer at 812 runs prior to an expiration of the timer at 812. In one aspect, the UE may monitor the RAR window for the Msg 2 after transmitting the Msg 1, the RAR window starting after the time gap and extending until the expiration of the timer at 812. In another aspect, the UE may monitor the contention resolution window for the Msg 4 after transmitting the Msg 3, the contention resolution window starting after the time gap and extending until the expiration of the timer at 812. For example, at 718, the UE 702 may monitor for the second random access message from the network entity 704 in response to the first random access message transmitted to the network entity 704. Furthermore, 814 may be performed by the BWP switch RACH component 198.

At 816, the UE may receive the second random access message from the network entity in the second BWP following the time gap after transmitting the first random access message. In one aspect, the first random access message may include the Msg 1, and the second random access message may include the Msg 2 in response to the Msg 1, where the Msg 2 is transmitted to the UE within the RAR window configured after the time gap. In another aspect, the first random access message may be a Msg 3, and the second random access message may include the Msg 4 in response to the Msg 3, where the Msg 4 is transmitted to the UE within the contention resolution window configured after the time gap. For example, at 720, the UE 702 may receive the second random access message from the network entity 704 in the second BWP following the time gap after transmitting the first random access message. Furthermore, 816 may be performed by the BWP switch RACH component 198.

Figure 9:
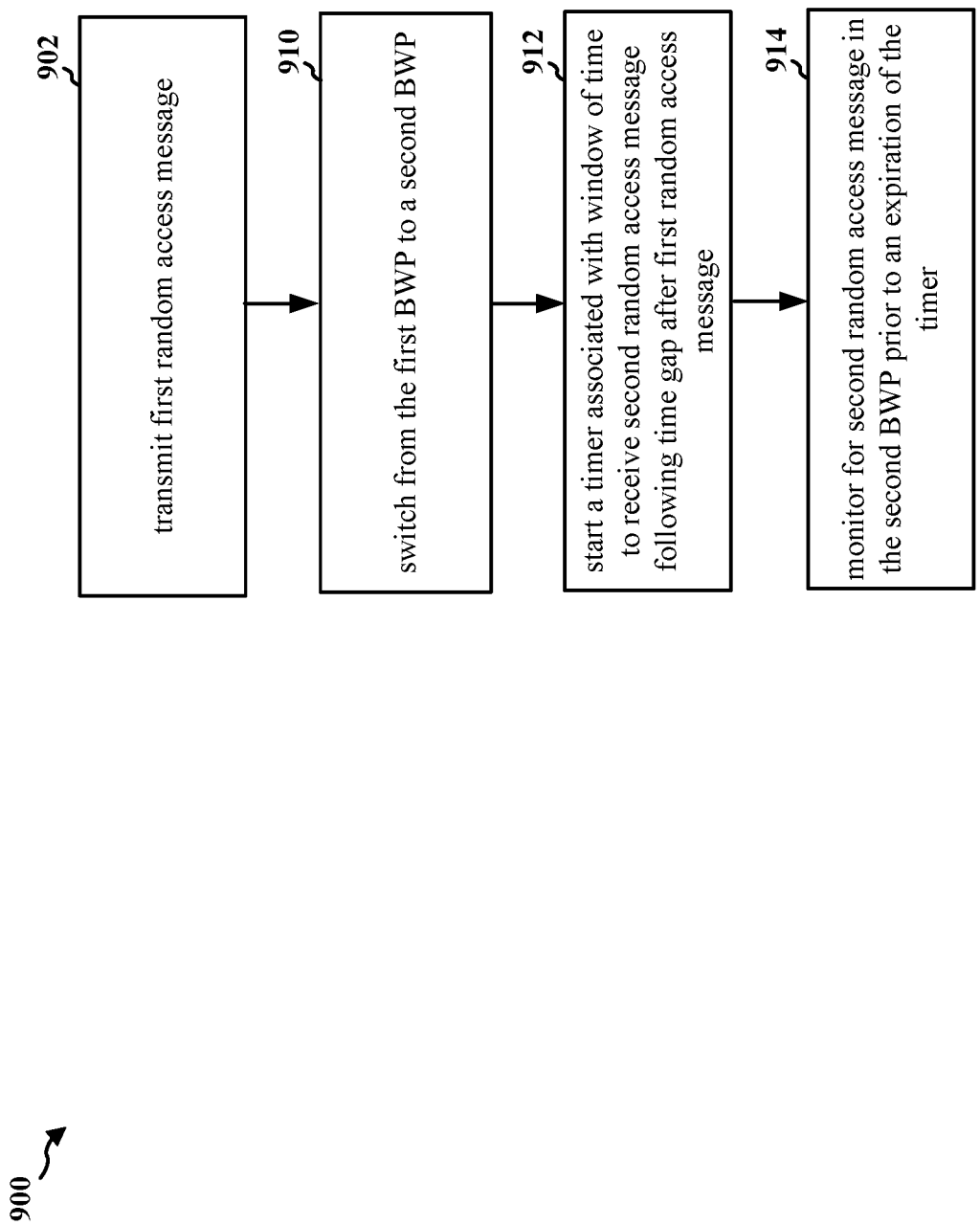
FIG. 9 is a flowchart illustrating a method of wireless communication that supports BWP switching.

FIG. 9 is a flowchart 900 illustrating a method of wireless communication that supports BWP switching. That is, FIG. 9 is the flowchart 900 illustrating the method of wireless communication performed by a UE that supports BWP switching in accordance with some aspects of the present disclosure. The method may be performed by a UE (for example, the UE 104; the apparatus 1204). The UE may support BWP switching in accordance with some aspects of the present disclosure. The UE may transmit a first random access message to a network entity in a first BWP, switch from the first BWP to a second BWP, and start a timer associated with the window of time to receive a second random access message from the network entity in the second BWP following a time gap after transmission of the first random access message.

At 902, the UE may transmit the first random access message to the network entity in the first BWP. The first random access message may be a Msg 1, or the first random access message may be a Msg 3. For example, at 706, the UE 702 may transmit the first random access message to the network entity 704 in the first BWP. Furthermore, 902 may be performed by a BWP switch RACH component 198.

The BWP may switch after transmitting the first random access message to the network entity and before receiving a second random access message from the network entity. Here, the second random access message may be a Msg 2 in response to the Msg 1 or a Msg 4 in response to the Msg 3. The UE may apply a time gap after transmitting the first random access message and before starting a timer associated with the window of time to receive the second random access message. In one aspect, the switch from the first BWP to the second BWP may correspond to or be based on an SCS change from a first SCS to a second SCS.

In one aspect, the timing gap maybe determined based on a configuration defined for the network entity and the UE. That is, the configuration of the time gap may be defined, for example, in a telecommunication standard, for the UE and the network entity, and the UE and the network entity may determine the time gap based on the defined configuration of the time gap. For one example, the defined configuration of the time gap may include a matrix or a table of the time gap with respect to the SCSs of the first random access message and the second random access message or the BWPs of the first random access message and the second random access message. For another example, the specified configuration of the time gap may include a formula for determining the time gap based on at least one SCS of the first random access message or the second random access message or based on the first BWP or the second BWP.

In another aspect, the time gap may be based on a function of BWP switch delay for switching the BWP from the first BWP to the second BWP. That is, the time gap may be based on the BWP switch delay provided to accommodate for the BWP switch. In another aspect, the time gap may be based on a relationship between a first SCS of the first BWP and a second SCS of the second BWP. For one example, the time gap may be determined based on a difference between the first SCS and the second SCS. For another example, the time gap may be determined based on a ratio of the second SCS to the first SCS.

In another aspect, the time gap may be based on at least one of a first bandwidth of the first BWP or a second bandwidth of the second BWP. For one example, the time gap may be determined based on the first bandwidth of the first BWP. For another example, the time gap may be determined based on the second bandwidth of the second BWP. Also, the time gap may be determined based on a relationship between the first bandwidth of the first BWP and the second bandwidth of the second BWP. For one example, the time gap may be determined based on a difference between the first bandwidth and the second bandwidth. For another example, the time gap may be determined based on a ratio of the second bandwidth to the first bandwidth. In another aspect, the time gap may be based on a frequency gap between the first BWP and the second BWP. For example, the frequency gap may be a frequency location gap determined as the frequency gap between the center frequency of the first BWP and the center frequency of the second BWP.

In some aspects, the timer may include a first timer and a second timer. The window of time associated with the first timer may be the RAR window for receiving the Msg 2, and the window of time associated with the second timer may be the contention resolution window for receiving the Msg 4. Here, the first timer may be configured to start following the first time gap and the second timer is configured to start following the second time gap. In one aspect, the first time gap associated with the first timer associated with the RAR window for receiving the Msg 2 may be different from the second time gap associated with second timer associated with the contention resolution window for receiving a Msg 4. In another aspect, the first time gap associated with the first timer associated with the RAR window for receiving the Msg 2 may be same with the second time gap associated with the second timer associated with the contention resolution window for receiving a Msg 4.

At 910, the UE may switch from the first BWP to the second BWP. The switching to the second BWP may be based on the configuration of the time gap received from the network entity at 908. In one aspect, the switch from the first BWP to the second BWP may correspond to or be based on an SCS change from a first SCS to a second SCS. For example, at 714, the UE 702 may switch from the first BWP to the second BWP. Furthermore, 910 may be performed by the BWP switch RACH component 198.

At 912, the UE may start a timer following a time gap after transmission of the first random access message in the first BWP, the timer associated with a window of time for receiving a second random access message from the network entity in the second BWP. In one aspect, the first random access message may be a Msg 1, and the window of time may be a RAR window for receiving the Msg 2 in response to the Msg 1 from the network entity, the time gap may be a first time gap, the timer may be a RAR window timer, and the RAR window may extend until the expiration of the RAR window timer. For example, the RAR window timer may start after the first time gap, and the RAR window may extend until the expiration of the RAR window timer. In another aspect, the first random access message may be a Msg 3, the window of time may be a contention resolution window for receiving the Msg 4 in response to the Msg 3 from the network entity, the time gap may be a second time gap, the timer may be a contention resolution window timer, and the contention resolution window may extend until the expiration of the contention resolution window timer. For example, the contention resolution window timer may start after the second time gap, and the contention resolution window may extend until the expiration of the contention resolution window timer. For example, at 716, the UE 702 may start a timer following a time gap after transmission of the first random access message in the first BWP, the timer associated with a window of time for receiving a second random access message from the network entity 704 in the second BWP. Furthermore, 912 may be performed by the BWP switch RACH component 198.

At 914, the UE may monitor for the second random access message within the window of time to receive the second random access message from the network entity in response to the first random access message transmitted to the network entity. The UE may monitor for the second random access message while the timer at 912 runs prior to an expiration of the timer at 912. In one aspect, the UE may monitor the RAR window for the Msg 2 after transmitting the Msg 1, the RAR window starting after the time gap and extending until the expiration of the timer at 912. In another aspect, the UE may monitor the contention resolution window for the Msg 4 after transmitting the Msg 3, the contention resolution window starting after the time gap and extending until the expiration of the timer at 912. For example, at 718, the UE 702 may monitor for the second random access message from the network entity 704 in response to the first random access message transmitted to the network entity 704. Furthermore, 914 may be performed by the BWP switch RACH component 198.

Figure 10:
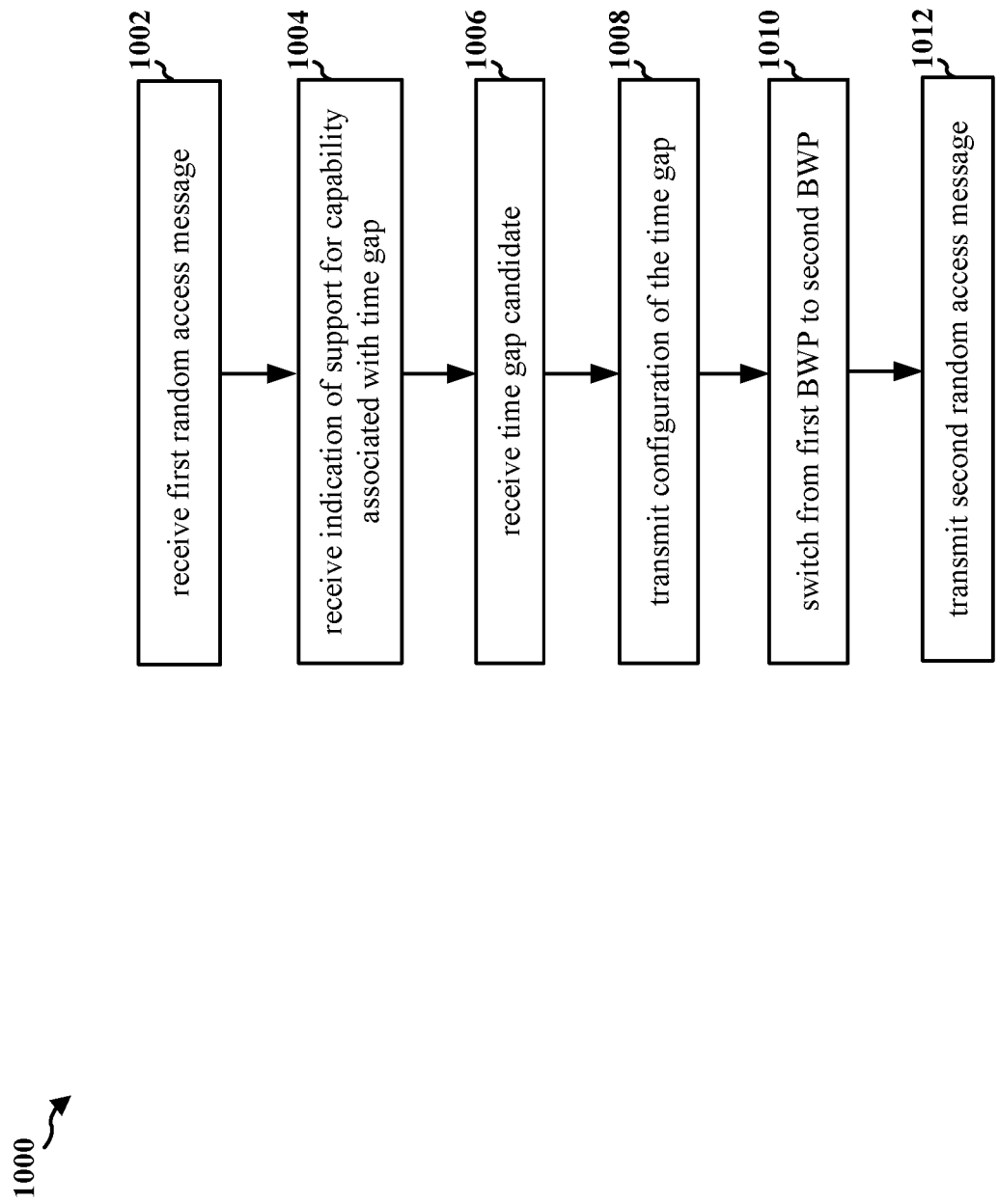
FIG. 10 is a flowchart illustrating a method of wireless communication that supports BWP switching.

FIG. 10 is a flowchart 1000 of a method of wireless communication that supports BWP switching. That is, FIG. 10 is the flowchart 1000 illustrating the method of wireless communication performed by a base station that supports BWP switching in accordance with some aspects of the present disclosure. The method may be performed by a base station (for example, the base station 102; the network entity 1202. The network entity may support BWP switching in accordance with some aspects of the present disclosure. The network entity may receive a first random access message from a UE in a first BWP, and transmit a second random access message to the UE in a second BWP following a time gap after the first random access message.

At 1002, the network entity may receive the first random access message from the UE in the first BWP. The first random access message may be a Msg 1, or the first random access message may be a Msg 3. For example, at 706, the network entity network entity 704 may receive the first random access message from the UE 702 in the first BWP. Furthermore, 1002 may be performed by a BWP switch RACH component 198.

The BWP may switch after transmitting the first random access message to the network entity and before receiving a second random access message from the network entity. Here, the second random access message may be a Msg 2 in response to the Msg 1 or a Msg 4 in response to the Msg 3. The UE may apply a time gap after transmitting the first random access message and before starting a timer associated with the window of time to receive the second random access message. In one aspect, the switch from the first BWP to the second BWP may correspond to or be based on an SCS change from a first SCS to a second SCS.

In one aspect, the timing gap maybe determined based on a configuration defined for the network entity and the UE. That is, the configuration of the time gap may be defined, for example, in a telecommunication standard, for the UE and the network entity, and the UE and the network entity may determine the time gap based on the defined configuration of the time gap. For one example, the defined configuration of the time gap may include a matrix or a table of the time gap with respect to the SCSs of the first random access message and the second random access message or the BWPs of the first random access message and the second random access message. For another example, the specified configuration of the time gap may include a formula for determining the time gap based on at least one SCS of the first random access message or the second random access message or based on the first BWP or the second BWP.

In another aspect, the time gap may be based on a function of a BWP switch delay for switching the BWP from the first BWP to the second BWP. That is, the time gap may be based on the BWP switch delay provided to accommodate for the BWP switch. In another aspect, the time gap may be based on a relationship between a first SCS of the first BWP and a second SCS of the second BWP. For one example, the time gap may be determined based on a difference between the first SCS and the second SCS. For another example, the time gap may be determined based on a ratio of the second SCS to the first SCS.

In another aspect, the time gap may be based on at least one of a first bandwidth of the first BWP or a second bandwidth of the second BWP. For one example, the time gap may be determined based on the first bandwidth of the first BWP. For another example, the time gap may be determined based on the second bandwidth of the second BWP. Also, the time gap may be determined based on a relationship between the first bandwidth of the first BWP and the second bandwidth of the second BWP. For one example, the time gap may be determined based on a difference between the first bandwidth and the second bandwidth. For another example, the time gap may be determined based on a ratio of the second bandwidth to the first bandwidth. In another aspect, the time gap may be based on a frequency gap between the first BWP and the second BWP. For example, the frequency gap may be a frequency location gap determined as the frequency gap between the center frequency of the first BWP and the center frequency of the second BWP.

In some aspects, the timer may include a first timer and a second timer. The window of time associated with the first timer may be the RAR window for receiving the Msg 2, and the window of time associated with the second timer may be the contention resolution window for receiving the Msg 4. Here, the first timer may be configured to start following the first time gap and the second timer is configured to start following the second time gap. In one aspect, the first time gap associated with the first timer associated with the RAR window for receiving the Msg 2 may be different from the second time gap associated with second timer associated with the contention resolution window for receiving a Msg 4. In another aspect, the first time gap associated with the first timer associated with the RAR window for receiving the Msg 2 may be same with the second time gap associated with the second timer associated with the contention resolution window for receiving a Msg 4.

At 1004, the network entity may receive the indication of support for the capability associated with the BWP switch delay. The time gap may be based on the support for the capability associated with the BWP switch delay received from the UE. For example, at 708, the network entity network entity 704 may receive, from the UE 702, the indication of support for the capability associated with the BWP switch delay. Furthermore, 1004 may be performed by the BWP switch RACH component 198.

At 1006, the network entity may receive the time gap candidate from the UE. The time gap may be determined based on the time gap candidate. For example, at 710, the network entity network entity 704 may receive the time gap candidate from the UE 702. Furthermore, 1006 may be performed by the BWP switch RACH component 198.

At 1008, the network entity may transmit a configuration of the time gap to the UE. In one aspect, the time gap may be determined based on the configuration of the time gap transmitted by the network entity. In another aspect, the network entity may determine the time gap and the configuration of the time gap indicates the time gap to the UE. For example, at 712, the network entity network entity 704 may transmit a configuration of the time gap to the UE 702. Furthermore, 1008 may be performed by the BWP switch RACH component 198.

At 1010, the network entity may switch from the first BWP to the second BWP. The switching to the second BWP may be based on the configuration of the time gap received from the network entity at 1008. In one aspect, the switch from the first BWP to the second BWP may correspond to or be based on an SCS change from a first SCS to a second SCS. For example, at 715, the network entity network entity 704 may switch from the first BWP to the second BWP. Furthermore, 1010 may be performed by the BWP switch RACH component 198.

The network entity may transmit the second random access message after expiration of the timer. In some aspects, the time gap may include a first time gap and a second time gap, where the first time gap may be added after reception of the Msg 1 and the Msg 2 is transmitted following the first time gap, and where the second time gap may be added after reception of the Msg 3 and the Msg 4 is transmitted following the second time gap. In one example, the first random access message may be the Msg 1, the second random access message may be the Msg 2, and the time gap may be a first time gap, and the network entity may transmit the Msg 2 after the expiration of the first timer. In another example, the first random access message may be the Msg 3, the second random access message may be the Msg 4, and the time gap may be a second time gap, and the network entity may transmit the Msg 4 after the expiration of the second timer.

At 1012, the network entity may transmit the second random access message to the UE in the second BWP following the time gap after the first random access message. In one aspect, the first random access message may include the Msg 1, and the second random access message may include the Msg 2 in response to the Msg 1, where the Msg 2 is transmitted to the UE within the RAR window configured after the time gap. In another aspect, the first random access message may be a Msg 3, and the second random access message may include the Msg 4 in response to the Msg 3, where the Msg 4 is transmitted to the UE within the contention resolution window configured after the time gap. For example, at 720, the network entity network entity 704 may transmit the second random access message to the UE 702 in the second BWP following the time gap after the first random access message. Furthermore, 1012 may be performed by the BWP switch RACH component 198.

Figure 11:
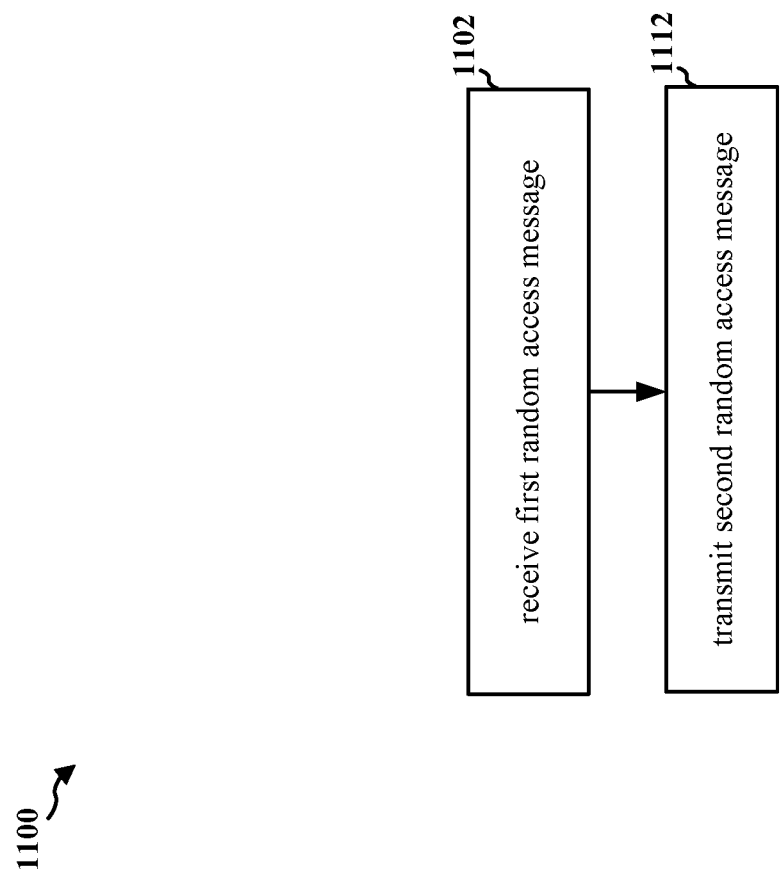
FIG. 11 is a flowchart illustrating a method of wireless communication that supports BWP switching.

FIG. 11 is a flowchart 1100 of a method of wireless communication that supports BWP switching. That is, FIG. 11 is the flowchart 1100 illustrating the method of wireless communication performed by a base station that supports BWP switching in accordance with some aspects of the present disclosure. The method may be performed by a base station (for example, the base station 102; the network entity 1302). The network entity may support BWP switching in accordance with some aspects of the present disclosure. The network entity may receive a first random access message from a UE in a first BWP, and transmit a second random access message to the UE in a second BWP following a time gap after the first random access message.

At 1102, the network entity may receive the first random access message from the UE in the first BWP. The first random access message may be a Msg 1, or the first random access message may be a Msg 3. For example, at 706, the network entity network entity 704 may receive the first random access message from the UE 702 in the first BWP. Furthermore, 1102 may be performed by a BWP switch RACH component 198.

The BWP may switch after transmitting the first random access message to the network entity and before receiving a second random access message from the network entity. Here, the second random access message may be a Msg 2 in response to the Msg 1 or a Msg 4 in response to the Msg 3. The UE may apply a time gap after transmitting the first random access message and before starting a timer associated with the window of time to receive the second random access message. In one aspect, the switch from the first BWP to the second BWP may correspond to or be based on an SCS change from a first SCS to a second SCS.

In one aspect, the timing gap maybe determined based on a configuration defined for the network entity and the UE. That is, the configuration of the time gap may be defined, for example, in a telecommunication standard, for the UE and the network entity, and the UE and the network entity may determine the time gap based on the defined configuration of the time gap. For one example, the defined configuration of the time gap may include a matrix or a table of the time gap with respect to the SCSs of the first random access message and the second random access message or the BWPs of the first random access message and the second random access message. For another example, the specified configuration of the time gap may include a formula for determining the time gap based on at least one SCS of the first random access message or the second random access message or based on the first BWP or the second BWP.

In another aspect, the time gap may be based on a function of a BWP switch delay for switching the BWP from the first BWP to the second BWP. That is, the time gap may be based on the BWP switch delay provided to accommodate for the BWP switch. In another aspect, the time gap may be based on a relationship between a first SCS of the first BWP and a second SCS of the second BWP. For one example, the time gap may be determined based on a difference between the first SCS and the second SCS. For another example, the time gap may be determined based on a ratio of the second SCS to the first SCS.

In another aspect, the time gap may be based on at least one of a first bandwidth of the first BWP or a second bandwidth of the second BWP. For one example, the time gap may be determined based on the first bandwidth of the first BWP. For another example, the time gap may be determined based on the second bandwidth of the second BWP. Also, the time gap may be determined based on a relationship between the first bandwidth of the first BWP and the second bandwidth of the second BWP. For one example, the time gap may be determined based on a difference between the first bandwidth and the second bandwidth. For another example, the time gap may be determined based on a ratio of the second bandwidth to the first bandwidth. In another aspect, the time gap may be based on a frequency gap between the first BWP and the second BWP. For example, the frequency gap may be a frequency location gap determined as the frequency gap between the center frequency of the first BWP and the center frequency of the second BWP.

In some aspects, the timer may include a first timer and a second timer. The window of time associated with the first timer may be the RAR window for receiving the Msg 2, and the window of time associated with the second timer may be the contention resolution window for receiving the Msg 4. Here, the first timer may be configured to start following the first time gap and the second timer is configured to start following the second time gap. In one aspect, the first time gap associated with the first timer associated with the RAR window for receiving the Msg 2 may be different from the second time gap associated with second timer associated with the contention resolution window for receiving a Msg 4. In another aspect, the first time gap associated with the first timer associated with the RAR window for receiving the Msg 2 may be same with the second time gap associated with the second timer associated with the contention resolution window for receiving a Msg 4.

The network entity may transmit the second random access message after expiration of the timer. In some aspects, the time gap may include a first time gap and a second time gap, where the first time gap may be added after reception of the Msg 1 and the Msg 2 is transmitted following the first time gap, and where the second time gap may be added after reception of the Msg 3 and the Msg 4 is transmitted following the second time gap. In one example, the first random access message may be the Msg 1, the second random access message may be the Msg 2, and the time gap may be a first time gap, and the network entity may transmit the Msg 2 after the expiration of the first timer. In another example, the first random access message may be the Msg 3, the second random access message may be the Msg 4, and the time gap may be a second time gap, and the network entity may transmit the Msg 4 after the expiration of the second timer.

At 1112, the network entity may transmit the second random access message to the UE in the second BWP following the time gap after the first random access message. In one aspect, the first random access message may include the Msg 1, and the second random access message may include the Msg 2 in response to the Msg 1, where the Msg 2 is transmitted to the UE within the RAR window configured after the time gap. In another aspect, the first random access message may be a Msg 3, and the second random access message may include the Msg 4 in response to the Msg 3, where the Msg 4 is transmitted to the UE within the contention resolution window configured after the time gap. For example, at 720, the network entity network entity 704 may transmit the second random access message to the UE 702 in the second BWP following the time gap after the first random access message. Furthermore, 1112 may be performed by the BWP switch RACH component 198.

Figure 12:
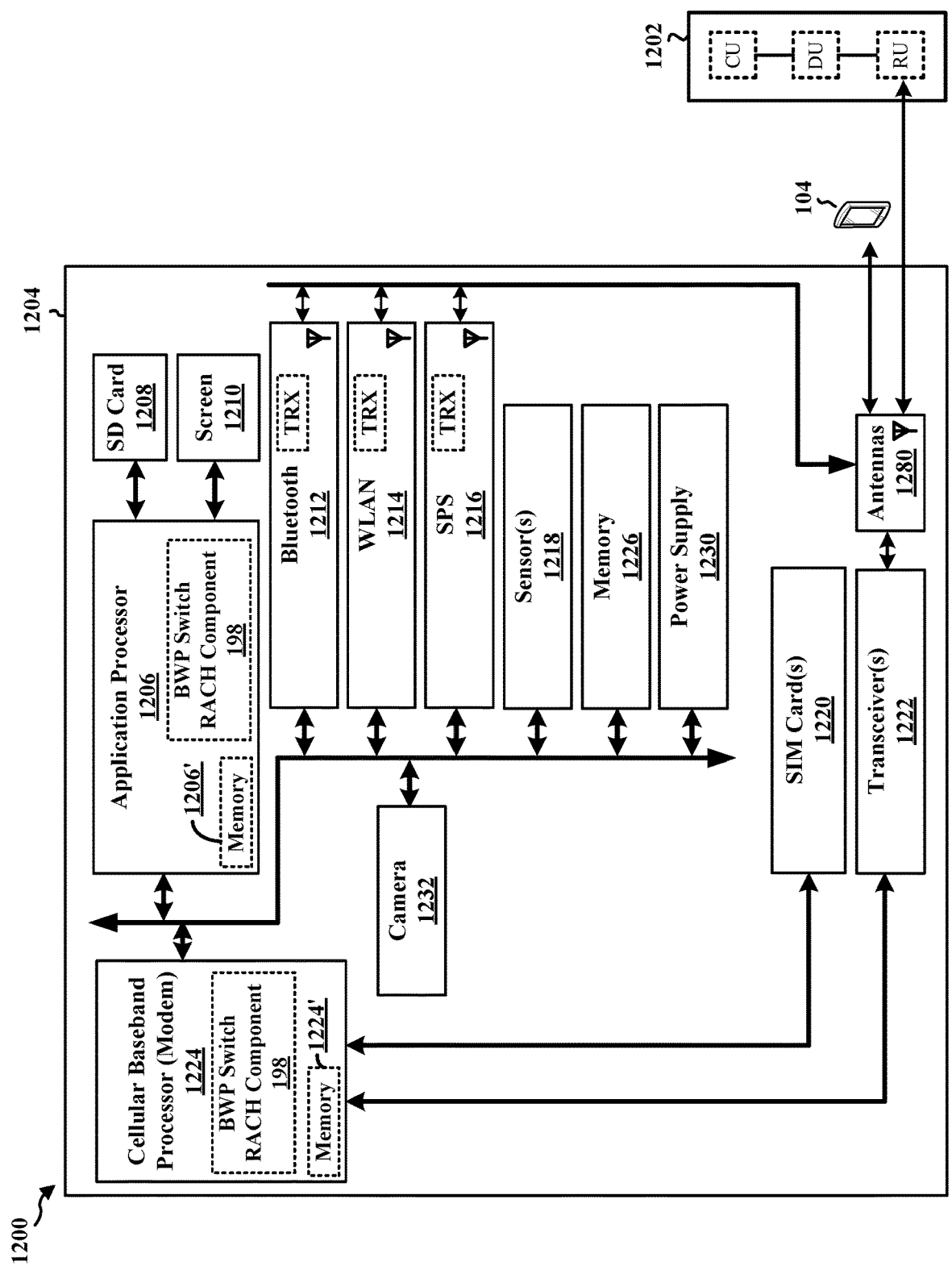
FIG. 12 is a diagram illustrating an example of a hardware implementation for an example apparatus or network entity that supports BWP switching.

FIG. 12 is a diagram 1200 illustrating an example of a hardware implementation for an apparatus 1204 that supports BWP switching. The apparatus 1204 may be a UE, a component of a UE, or may implement UE functionality. In some aspects, the apparatus 1204 may include a cellular baseband processor 1224 (also referred to as a modem) coupled to one or more transceivers 1222 (for example, cellular RF transceiver). The cellular baseband processor 1224 may include on-chip memory 1224'. In some aspects, the apparatus 1204 may further include one or more subscriber identity modules (SIM) cards 1220 and an application processor 1206 coupled to a secure digital (SD) card 1208 and a screen 1210. The application processor 1206 may include on-chip memory 1206'. In some aspects, the apparatus 1204 may further include a Bluetooth module 1212, a WLAN module 1214, an SPS module 1216 (for example, GNSS module), one or more sensor modules 1218 (for example, barometric pressure sensor/altimeter; motion sensor such as inertial management unit (IMU), gyroscope, or accelerometer(s); light detection and ranging (LIDAR), radio assisted detection and ranging (RADAR), sound navigation and ranging (SONAR), magnetometer, audio or other technologies used for positioning), additional memory modules 1226, a power supply 1230, or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas or utilize the antennas 1280 for communication. The cellular baseband processor 1224 communicates through the transceiver(s) 1222 via one or more antennas 1280 with the UE 104 or with an RU associated with a network entity 1202. The cellular baseband processor 1224 and the application processor 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor 1224 and the application processor 1206 are each responsible for general processing, including the execution of software stored on the computer-readable medium/memory. The software, when executed by the cellular baseband processor 1224/application processor 1206, causes the cellular baseband processor 1224/application processor 1206 to perform the various functions described supra. The computer-readable medium/memory may also be used for storing data that is manipulated by the cellular baseband processor 1224/application processor 1206 when executing software. The cellular baseband processor 1224/application processor 1206 may be a component of the UE 350 and may include the memory 360 or at least one of the TX processor 368, the RX processor 356, and the controller/processor 359. In one configuration, the apparatus 1204 may be a processor chip (modem or application) and include just the cellular baseband processor 1224 or the application processor 1206, and in another configuration, the apparatus 1204 may be the entire UE (for example, see 350 of FIG. 3) and include the additional modules of the apparatus 1204.

As discussed supra, the BWP switch RACH component 198 is configured to transmit, to a base station, a first random access message in a first BWP, switch from the first BWP to a second BWP after transmitting the first random access message, start a timer following a time gap after transmission of the first random access message in the first BWP, the timer associated with a window of time for receiving a second random access message from the base station in the second BWP, and monitor for the second random access message in the second BWP prior to an expiration of the timer. The BWP switch RACH component 198 may be within the cellular baseband processor 1224, the application processor 1206, or both the cellular baseband processor 1224 and the application processor 1206. The BWP switch RACH component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1204 may include a variety of components configured for various functions. In one configuration, the apparatus 1204, and in particular the cellular baseband processor 1224 or the application processor 1206, includes means for transmitting, to a base station, a first random access message in a first BWP, means for switching from the first BWP to a second BWP after transmitting the first random access message, means for starting a timer following a time gap after transmission of the first random access message in the first BWP, the timer associated with a window of time for receiving a second random access message from the base station in the second BWP, and means for monitoring for the second random access message in the second BWP prior to an expiration of the timer. In one configuration, the first random access message is a Msg 1, the second random access message is a Msg 2, and the window of time is a RAR window that extends until the expiration of the timer. In one configuration, the first random access message is a Msg 3, the second random access message is a Msg 4, and the window of time is a contention resolution window that extends until the expiration of the timer. In one configuration, the apparatus 1204, and in particular the cellular baseband processor 1224 or the application processor 1206, includes means for receiving a configuration of the time gap from the base station. In one configuration, the apparatus 1204, and in particular the cellular baseband processor 1224 or the application processor 1206, includes means for transmitting a time gap candidate to the base station before the window of time, where the configuration of the time gap from the base station is based on the time gap candidate. In one configuration, the apparatus 1204, and in particular the cellular baseband processor 1224 or the application processor 1206, includes means for transmitting, to the base station, an indication of support for a capability associated with a BWP switch delay, where the time gap is based on the support for the capability. In one configuration, the time gap is based on a function of a BWP switch delay for switching the BWP from the first BWP to the second BWP. In one configuration, the time gap is based on a relationship between a first SCS of the first BWP and a second SCS of the second BWP. In one configuration, the time gap is based on at least one of a first bandwidth of the first BWP or a second bandwidth of the second BWP. In one configuration, the time gap is based on a frequency gap between the first BWP and the second BWP. In one configuration, the time gap includes a first time gap and a second time gap, the timer is one of a first timer or a second timer, the window of time associated with the first timer is a RAR window for receiving a Msg 2, and the window of time associated with the second timer is a contention resolution window for receiving a Msg 4, and the first timer is configured to start following the first time gap and the second timer is configured to start following the second time gap. In one configuration, the first time gap provided before the first timer associated with the RAR window for receiving the Msg 2 and the second time gap provided before the second timer associated with the contention resolution window for receiving the Msg 4 have different time durations. In one configuration, the first time gap provided before the first timer associated with the RAR window for receiving the Msg 2 and the second time gap provided before the second timer associated with the contention resolution window for receiving the Msg 4 have a same time duration. In one configuration, the switching from the first BWP to the second BWP is based on a change of a SCS from a first SCS to a second SCS. The means may be the BWP switch RACH component 198 of the apparatus 1204 configured to perform the functions recited by the means. As described supra, the apparatus 1204 may include the TX processor 368, the RX processor 356, and the controller/processor 359. As such, in one configuration, the means may be the TX processor 368, the RX processor 356, or the controller/processor 359 configured to perform the functions recited by the means.

Figure 13:
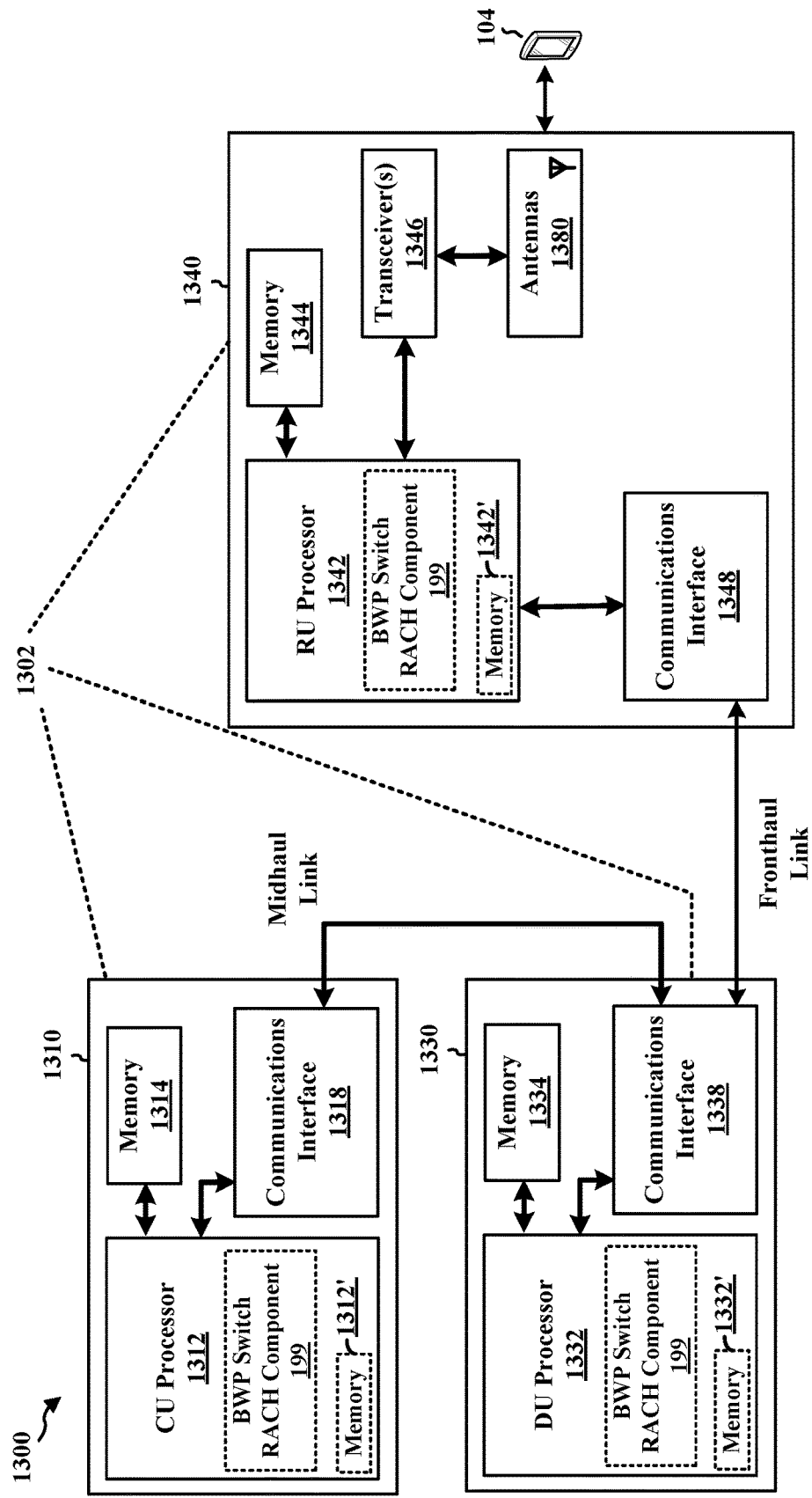
FIG. 13 is a diagram illustrating an example of a hardware implementation for an example network entity that supports BWP switching.

FIG. 13 is a diagram 1300 illustrating an example of a hardware implementation for a network entity 1302 that supports BWP switching. The network entity 1302 may be a BS, a component of a BS, or may implement BS functionality. The network entity 1302 may include at least one of a CU 1310, a DU 1330, or an RU 1340. For example, depending on the layer functionality handled by the BWP switch RACH component 199, the network entity 1302 may include the CU 1310; both the CU 1310 and the DU 1330; each of the CU 1310, the DU 1330, and the RU 1340; the DU 1330; both the DU 1330 and the RU 1340; or the RU 1340. The CU 1310 may include a CU processor 1312. The CU processor 1312 may include on-chip memory 1312'. In some aspects, the CU 1310 may further include additional memory modules 1314 and a communications interface 1318. The CU 1310 communicates with the DU 1330 through a midhaul link, such as an F1 interface. The DU 1330 may include a DU processor 1332. The DU processor 1332 may include on-chip memory 1332'. In some aspects, the DU 1330 may further include additional memory modules 1334 and a communications interface 1338. The DU 1330 communicates with the RU 1340 through a fronthaul link. The RU 1340 may include an RU processor 1342. The RU processor 1342 may include on-chip memory 1342'. In some aspects, the RU 1340 may further include additional memory modules 1344, one or more transceivers 1346, antennas 1380, and a communications interface 1348. The RU 1340 communicates with the UE 104. The on-chip memory 1312', 1332', 1342' and the additional memory modules 1314, 1334, 1344 may each be considered a computer-readable medium/memory. Each computer-readable medium/memory may be non-transitory. Each of the processors 1312, 1332, 1342 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the BWP switch RACH component 199 is configured to receive, from a UE, a first random access message in a first BWP, add a time gap after reception of the first random access message, and transmit a second random access message to the UE in a second BWP following the time gap after the reception of the first random access message. The BWP switch RACH component 199 may be within one or more processors of one or more of the CU 1310, DU 1330, and the RU 1340. The BWP switch RACH component 199 may be one or more hardware components specifically configured to carry out the stated processes/ algorithm, implemented by one or more processors configured to perform the stated processes/algorithm, stored within a computer-readable medium for implementation by one or more processors, or some combination thereof. The network entity 1302 may include a variety of components configured for various functions. In one configuration, the network entity 1302 includes means for receiving, from a UE, a first random access message in a first BWP, and means for transmitting a second random access message to the UE in a second BWP following a time gap after reception of the first random access message. In one configuration, the first random access message includes a Msg 1, and the second random access message includes a Msg 2, and the Msg 2 is transmitted within a RAR window. In one configuration, the first random access message includes a Msg 3, and the second random access message includes a Msg 4, and the Msg 4 is transmitted within a contention resolution window. In one configuration, the network entity 1302 includes means for transmitting a configuration of the time gap to the UE. In one configuration, the network entity 1302 includes means for receiving a time gap candidate for the UE before transmitting the second random access message, where the configuration of the time gap is based on the time gap candidate. In one configuration, the network entity 1302 includes means for receiving an indication of support for a capability of the UE associated with a BWP switch delay, where the time gap is based on the support for the capability. In one configuration, the time gap is based on a function of a BWP switch delay for switching the BWP from the first BWP to the second BWP. In one configuration, the time gap is based on a relationship between a first SCS of the first BWP and a second SCS of the second BWP. In one configuration, the time gap is based on at least one of a first bandwidth of the first BWP or a second bandwidth of the second BWP. In one configuration, the time gap is based on a frequency gap between the first BWP and the second BWP. In one configuration, the first random access message includes a Msg 1 and a Msg 3, the second random access message includes a Msg 2 and a Msg 4, and the time gap includes a first time gap and a second time gap, where the Msg 2 is transmitted following the first time gap after reception of the Msg 1, and the Msg 4 is transmitted following the second time gap after reception of the Msg 3. In one configuration, the first time gap added before transmitting the Msg 2 and the second time gap added before transmitting the Msg 4 have different time lengths. In one configuration, the first time gap added before transmitting the Msg 2 and the second time gap added before transmitting the Msg 4 have a same time length. In one configuration, the network entity 1302 includes means for switching from the first BWP to the second BWP after receiving the first random access message, and where the switch from the first BWP to the second BWP is based on a change of a SCS from a first SCS to a second SCS. The means may be the BWP switch RACH component 199 of the network entity 1302 configured to perform the functions recited by the means. As described supra, the network entity 1302 may include the TX processor 316, the RX processor 370, and the controller/ processor 375. As such, in one configuration, the means may be the TX processor 316, the RX processor 370, or the controller/processor 375 configured to perform the functions recited by the means.

A UE may transmit a first random access message to a base station in a first BWP, switch from the first BWP to a second BWP, and start a timer following a time gap after transmission of the first random access message in the first BWP, the timer associated with a window of time for receiving a second random access message from the base station in the second BWP. The window of time may be a RAR window or a contention resolution window that extends until the expiration of the timer. The switch from the first BWP to the second BWP may correspond to or be based on an SES change from a first SCS to a second SCS. The UE may transmit an indication of support for a capability associated with a BWP switch delay or a time gap candidate to the base station, and the base station may determine the configuration of the time gap. The base station may transmit the configuration of the time gap to the UE. The time gap may be determined based on the configuration of the time gap. The configuration of the time gap may be defined for the base station and the UE. The time gap may be determined based on at least one of a function of a BWP switch delay, a relationship between a first SCS of the first BWP and a second SCS of the second BWP, at least one of a first bandwidth of the first BWP or a second bandwidth of the second BWP, or a frequency gap between the first BWP and the second BWP. The time gap may be different for a first timer of RAR window and a second timer of contention resolution window.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. The claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, for example, "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets may be interpreted as a set of elements where the elements number one or more. For a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method for wireless communication at a UE, including transmitting, to a base station, a first random access message in a first BWP, switching from the first BWP to a second BWP after transmitting the first random access message, starting a timer following a time gap after transmission of the first random access message in the first BWP, the timer associated with a window of time for receiving a second random access message from the base station in the second BWP, and monitoring for the second random access message in the second BWP prior to an expiration of the timer.

Aspect 2 is the method of aspect 1, where the first random access message is a Msg 1, the second random access message is a Msg 2, and the window of time is a RAR window that extends from the start of the timer until the expiration of the timer.

Aspect 3 is the method of any of aspects 1 and 2, where the first random access message is a Msg 3, the second random access message is a Msg 4, and the window of timer is a contention resolution window that extends from the start of the timer until the expiration of the timer.

Aspect 4 is the method of any of aspects 1 to 3, further including receiving a configuration of the time gap from the base station.

Aspect 5 is the method of aspect 4, further including transmitting a time gap candidate to the base station before the window of time, where the configuration of the time gap from the base station is based on the time gap candidate.

Aspect 6 is the method of any of aspects 1 to 5, further including transmitting, to the base station, an indication of support for a capability associated with a BWP switch delay, where the time gap is based on the support for the capability.

Aspect 7 is the method of any of aspects 1 to 6, where a configuration of the time gap is defined for the base station and the UE.

Aspect 8 is the method of any of aspects 1 to 7, where the time gap is based on a function of a BWP switch delay for switching the BWP from the first BWP to the second BWP.

Aspect 9 is the method of any of aspects 1 to 8, where the time gap is based on a relationship between a first SCS of the first BWP and a second SCS of the second BWP.

Aspect 10 is the method of any of aspects 1 to 9, where the time gap is based on at least one of a first bandwidth of the first BWP or a second bandwidth of the second BWP.

Aspect 11 is the method of any of aspects 1 to 10, where the time gap is based on a frequency gap between the first BWP and the second BWP.

Aspect 12 is the method of any of aspects 1 to 11, where the time gap includes a first time gap and a second time gap, the timer is one of a first timer or a second timer, where the window of time associated with the first timer is a RAR window for receiving a Msg 2, and the window of time associated with the second timer is a contention resolution window for receiving a Msg 4, and the first timer is configured to start following the first time gap and the second timer is configured to start following the second time gap.

Aspect 13 is the method of aspect 12, where the first time gap provided before the first timer associated with the RAR window for receiving the Msg 2 and the second time gap provided before the second timer associated with the contention resolution window for receiving the Msg 4 have different time durations.

Aspect 14 is the method of aspect 12, where the first time gap provided before the first timer associated with the RAR window for receiving the Msg 2 and the second time gap provided before the second timer associated with the contention resolution window for receiving the Msg 4 have a same time duration.

Aspect 15 is the method of any of aspects 1 to 14, where switching from the first BWP to the second BWP is based on a change of an SCS from a first SCS to a second SCS.

Aspect 16 is an apparatus for wireless communication including at least one processor coupled to a memory and configured to implement any of aspects 1 to 15, further including a transceiver coupled to the at least one processor.

Aspect 17 is an apparatus for wireless communication including means for implementing any of aspects 1 to 15.

Aspect 18 is a non-transitory computer-readable medium storing computer executable code, where the code when executed by a processor causes the processor to implement any of aspects 1 to 15.

Aspect 19 is a method for wireless communication at a network node, including receiving a first random access message from a UE in a first BWP, and transmitting a second random access message to the UE in a second BWP following a time gap after reception of the first random access message.

Aspect 20 is the method of aspect 19, where the first random access message includes a Msg 1, and the second random access message includes a Msg 2, where the Msg 2 is transmitted to the UE within a RAR window.

Aspect 21 is the method of any of aspects 19 and 20, where the first random access message includes a Msg 3, and the second random access message includes a Msg 4, where the Msg 4 is transmitted to the UE within a contention resolution window.

Aspect 22 is the method of aspect 21, further including transmitting a configuration of the time gap from the base station.

Aspect 23 is the method of any of aspects 19 to 22, further including receiving a time gap candidate from the UE before transmitting the second random access message, where the configuration of the time gap from the base station is based on the time gap candidate.

Aspect 24 is the method of any of aspects 19 to 23, further including receiving, from the UE, an indication of support for a capability associated with a BWP switch delay, where the time gap is based on the support for the capability.

Aspect 25 is the method of any of aspects 19 to 24, where a configuration of the time gap is defined for the base station and the UE.

Aspect 26 is the method of any of aspects 19 to 25, where the time gap is based on a function of a BWP switch delay for switching the BWP from the first BWP to the second BWP.

Aspect 27 is the method of any of aspects 19 to 26, where the time gap is based on a relationship between a first SCS of the first BWP and a second SCS of the second BWP.

Aspect 28 is the method of any of aspects 19 to 27, where the time gap is based on at least one of a first bandwidth of the first BWP or a second bandwidth of the second BWP.

Aspect 29 is the method of any of aspects 19 to 28, where the time is gap based on a frequency gap between the first BWP and the second BWP.

Aspect 30 is the method of any of aspects 19 to 29, where the first random access message includes a Msg 1 and a Msg 3, the second random access message includes a Msg 2 and a Msg 4, and the time gap includes a first time gap and a second time gap, where the Msg 2 is transmitted following the first time gap after reception of the Msg 1, and the Msg 4 is transmitted following the second time gap after reception of the Msg 3.

Aspect 31 is the method of aspect 30, where the first time gap added before transmitting the Msg 2 and the second time gap added before transmitting the Msg 4 have different time lengths.

Aspect 32 is the method of aspect 30, where the first time gap added before transmitting the Msg 2 and the second time gap added before transmitting the Msg 4 have a same time length.

Aspect 33 is the method of any of aspects 19 to 32, including switching from the first BWP to the second BWP after receiving the first random access message, and where the switching from the first BWP to the second BWP is based on a change of an SCS from a first SCS to a second SCS.

Aspect 34 is an apparatus for wireless communication including at least one processor coupled to a memory and configured to implement any of aspects 19 to 33, further including a transceiver coupled to the at least one processor.

Aspect 35 is an apparatus for wireless communication including means for implementing any of aspects 19 to 33.

Aspect 36 is a non-transitory computer-readable medium storing computer executable code, where the code when executed by a processor causes the processor to implement any of aspects 19 to 33.

What is claimed is:

1. An apparatus for wireless communication at a user equipment (UE), comprising:
   memory; and
   at least one processor coupled to the memory and configured to:
      transmit, to a base station, a first random access message in a first bandwidth part (BWP) having a first subcarrier spacing (SCS);
      switch from the first BWP to activate a second BWP after transmitting the first random access message, wherein the second BWP has a second SCS that is different than the first SCS;
      delay, based on a BWP switch to the second BWP having a different SCS, starting a timer associated with a window of time for receiving a second random access message, wherein the delay includes a time gap associated with the BWP switch to the different SCS;
      start the timer following the time gap after transmission of the first random access message in the first BWP; and
      monitor for the second random access message in the second BWP prior to an expiration of the timer.

2. The apparatus of claim 1, wherein the first random access message is a Msg 1, the second random access message is a Msg 2, and the window of time is a random access response (RAR) window that extends until the expiration of the timer.

3. The apparatus of claim 1, wherein the first random access message is a Msg 3, the second random access message is a Msg 4, and the window of time is a contention resolution window that extends until the expiration of the timer.

4. The apparatus of claim 1, wherein the at least one processor is further configured to receive a configuration of the time gap from the base station.

5. The apparatus of claim 4, wherein the at least one processor is further configured to transmit a time gap candidate to the base station before the window of time, wherein the configuration of the time gap from the base station is based on the time gap candidate.

6. The apparatus of claim 1, wherein the at least one processor is further configured to transmit, to the base station, an indication of support for a capability associated with a BWP switch delay, wherein the time gap is based on the support for the capability.

7. The apparatus of claim 1, wherein the time gap is based on a function of a BWP switch delay for switching the BWP from the first BWP to the second BWP.

8. The apparatus of claim 1, wherein the time gap is based on a relationship between the first SCS of the first BWP and the second SCS of the second BWP.

9. The apparatus of claim 1, wherein the time gap is further based on at least one of a first bandwidth of the first BWP or a second bandwidth of the second BWP.

10. The apparatus of claim 1, wherein the time gap is further based on a frequency gap between the first BWP and the second BWP.

11. The apparatus of claim 1, wherein the time gap includes one of a first time gap or a second time gap,
wherein the timer is one of a first timer or a second timer,
wherein the window of time associated with the first timer is a random access response (RAR) window for receiving a Msg 2, and the window of time associated with the second timer is a contention resolution window for receiving a Msg 4, and
wherein the first timer is configured to start following the first time gap following a Msg 1 in the first BWP or the second timer is configured to start following the second time gap following a Msg 3 in the first BWP.

12. The apparatus of claim 11, wherein the first time gap provided before the first timer associated with the RAR window for receiving the Msg 2 and the second time gap provided before the second timer associated with the contention resolution window for receiving the Msg 4 have different time durations.

13. The apparatus of claim 11, wherein the first time gap provided before the first timer associated with the RAR window for receiving the Msg 2 and the second time gap provided before the second timer associated with the contention resolution window for receiving the Msg 4 have a same time duration.

14. A method of wireless communication at a user equipment (UE), comprising:
transmitting, to a base station, a first random access message in a first bandwidth part (BWP) having a first subcarrier spacing (SCS);
switching from the first BWP to activate a second BWP after transmitting the first random access message, wherein the second BWP has a second SCS that is different than the first SCS;
delaying, based on a BWP switch to the second BWP having a different SCS, starting a timer associated with a window of time for receiving a second random access message, wherein a delay includes a time gap associated with the BWP switch to the different SCS;
starting the timer following the time gap after transmission of the first random access message in the first BWP; and
monitoring for the second random access message in the second BWP prior to an expiration of the timer.

15. An apparatus for wireless communication at a network node, comprising:
memory; and
at least one processor coupled to the memory and configured to:
receive, from a user equipment (UE), a first random access message in a first bandwidth part (BWP);
delay, based on a BWP switch from the first BWP having a first subcarrier spacing to activate a second BWP having a different SCS, transmission of a second random access message, wherein the delay includes a time gap associated with the BWP switch to the different SCS; and
transmit the second random access message to the UE in the second BWP following the time gap after reception of the first random access message.

16. The apparatus of claim 15, wherein the first random access message comprises a Msg 1 and the second random access message comprises a Msg 2, wherein the Msg 2 is transmitted within a random access response (RAR) window.

17. The apparatus of claim 15, wherein the first random access message comprises a Msg 3 and the second random access message comprises a Msg 4, wherein the Msg 4 is transmitted within a contention resolution window.

18. The apparatus of claim 15, wherein the at least one processor is further configured to transmit a configuration of the time gap to the UE.

19. The apparatus of claim 18, wherein the at least one processor is further configured to receive a time gap candidate for the UE before transmitting the second random access message, wherein the configuration of the time gap is based on the time gap candidate.

20. The apparatus of claim 15, wherein the at least one processor is further configured to receive an indication of support for a capability of the UE associated with a BWP switch delay, wherein the time gap is based on the support for the capability.

21. The apparatus of claim 15, wherein the time gap is based on a function of a BWP switch delay for switching the BWP from the first BWP to the second BWP.

22. The apparatus of claim 15, wherein the time gap is based on a relationship between the first SCS of the first BWP and a second SCS of the second BWP.

23. The apparatus of claim 15, wherein the time gap is further based on at least one of a first bandwidth of the first BWP or a second bandwidth of the second BWP.

24. The apparatus of claim 15, wherein the time gap is further based on a frequency gap between the first BWP and the second BWP.

25. The apparatus of claim 15, wherein the first random access message includes a Msg 1 or a Msg 3, the second random access message includes a Msg 2 or a Msg 4, and the time gap includes a first time gap or a second time gap, and
wherein the Msg 2 is transmitted following the first time gap after the reception of the Msg 1, or
wherein the Msg 4 is transmitted following the second time gap after the reception of the Msg 3.

26. The apparatus of claim 25, wherein the first time gap added before a Msg 2 transmission and the second time gap added before a Msg 4 transmission have different time lengths.

27. The apparatus of claim 25, wherein the first time gap added before a Msg 2 transmission and the second time gap added before a Msg 4 transmission have a same time length.

28. The apparatus of claim 15, wherein the at least one processor is further configured to switch from the first BWP to the second BWP after receiving the first random access message.

29. A method of wireless communication at a network node, comprising:
- receiving, from a user equipment (UE), a first random access message in a first bandwidth part (BWP);
- delaying, based on a BWP switch from the first BWP having a first subcarrier spacing to activate a second BWP having a different SCS, transmission of a second random access message, wherein a delay includes a time gap associated with the BWP switch to the different SCS; and
- transmitting the second random access message to the UE in the second BWP following the time gap after reception of the first random access message.

\* \* \* \* \*